(12) United States Patent
Okada et al.

(10) Patent No.: US 10,112,448 B2
(45) Date of Patent: Oct. 30, 2018

(54) TIRE WHEEL POSITION DETECTION DEVICE AND TIRE PRESSURE MONITORING SYSTEM HAVING THE SAME

(71) Applicant: DENSO CORPORATION, Kariya, Aichi-pref. (JP)

(72) Inventors: Noriaki Okada, Kariya (JP); Masahiro Fukuda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/540,678

(22) PCT Filed: Jan. 25, 2016

(86) PCT No.: PCT/JP2016/000349
§ 371 (c)(1),
(2) Date: Jun. 29, 2017

(87) PCT Pub. No.: WO2016/121364
PCT Pub. Date: Aug. 4, 2016

(65) Prior Publication Data
US 2018/0022171 A1    Jan. 25, 2018

(30) Foreign Application Priority Data

Jan. 28, 2015 (JP) ................................. 2015-014546

(51) Int. Cl.
*G01M 17/00* (2006.01)
*G06F 7/00* (2006.01)
(Continued)

(52) U.S. Cl.
CPC .......... *B60C 23/0416* (2013.01); *G07C 5/085* (2013.01)

(58) Field of Classification Search
CPC ............................................... B60C 23/0416
See application file for complete search history.

(56) References Cited

U.S. PATENT DOCUMENTS

| 5,602,524 A | 2/1997 | Mock et al. |
| 6,018,993 A | 2/2000 | Normann et al. |

(Continued)

FOREIGN PATENT DOCUMENTS

| JP | H10048233 A | 2/1998 |
| JP | 3212311 B2 | 9/2001 |

(Continued)

*Primary Examiner* — Imran K Mustafa
(74) *Attorney, Agent, or Firm* — Harness, Dickey & Pierce, P.L.C.

(57) ABSTRACT

A tire wheel position detection device is provided. The tire wheel position detection device includes a transmitter attached to each tire wheel and including a first controller to transmit a frame including unique identification information, and a receiver including a second controller that performs tire wheel position detection through selecting, from the identification informations included in the frames, candidate identification informations indicating candidates to be registered, and identifying, from the candidate identification informations, the candidate identification informations that match the transmitters attached to the tire wheels, and storing the tire wheels and the identification informations of the transmitters in association with each other. Even if the candidate identification information is identified as the ID information of any of the transmitters, the second controller does not readily fix nor register it but makes a provisional fixing and definitely determines and registers it upon determining it is highly likely.

5 Claims, 11 Drawing Sheets

(51) Int. Cl.
  *G06F 19/00*    (2018.01)
  *B60C 23/04*    (2006.01)
  *G07C 5/08*     (2006.01)

(56) References Cited

U.S. PATENT DOCUMENTS

| | | |
|---|---|---|
| 6,489,888 B1 | 12/2002 | Honeck et al. |
| 7,010,968 B2 | 3/2006 | Stewart et al. |
| 2007/0008097 A1 | 1/2007 | Mori et al. |
| 2009/0160632 A1 | 6/2009 | Mori et al. |
| 2013/0222128 A1* | 8/2013 | Watabe ............... B60C 23/0416 340/447 |
| 2014/0167950 A1 | 6/2014 | Shima et al. |
| 2014/0340213 A1 | 11/2014 | Okada et al. |
| 2015/0183279 A1* | 7/2015 | Okada ................ B60C 23/0488 235/375 |

FOREIGN PATENT DOCUMENTS

| | | |
|---|---|---|
| JP | 2006069414 A | 3/2006 |
| JP | 2007015491 A | 1/2007 |
| JP | 2010122023 A | 6/2010 |
| JP | 2013014223 A | 1/2013 |
| JP | 2013126783 A | 6/2013 |
| JP | 5585595 B2 | 9/2014 |
| WO | WO-2012147396 A1 | 11/2012 |

\* cited by examiner

FIRST RECEPTION

SECOND RECEPTION

THIRD RECEPTION

| RECEPTION | TIME (t) | TOOTH POSITION AT RECEPTION TIME (0-95) | | | | TIRE WHEEL POSITION DETERMINATION LOGIC (TRUE or FALSE) | | | |
|---|---|---|---|---|---|---|---|---|---|
| | | FL | FR | RL | RR | FL | FR | RL | RR |
| RECEPTION 1 | 0.0 | 68 | 92 | 62 | 78 | — | — | — | — |
| RECEPTION 2 | 5.1 | 56 | 42 | 38 | 8 | TRUE | FALSE | TRUE | FALSE |
| RECEPTION 3 | 10.3 | 72 | 26 | 42 | 72 | TRUE | | TRUE | |
| RECEPTION 4 | 14.3 | 60 | 62 | 22 | 6 | TRUE | | FALSE | |

| RECEPTION | TIME (t) | TOOTH POSITION AT RECEPTION TIME (0-95) | | | | TIRE WHEEL POSITION DETERMINATION LOGIC (TRUE or FALSE) | | | |
|---|---|---|---|---|---|---|---|---|---|
| | | FL | FR | RL | RR | FL | FR | RL | RR |
| RECEPTION 1 | 0.0 | 38 | 68 | 30 | 50 | — | — | — | — |
| RECEPTION 2 | 4.1 | 2 | 78 | 80 | 46 | FALSE | TRUE | FALSE | TRUE |
| RECEPTION 3 | 8.3 | 42 | 74 | 14 | 28 | | TRUE | | TRUE |
| RECEPTION 4 | 12.4 | 88 | 78 | 52 | 22 | | TRUE | | FALSE |

| RECEPTION | TIME (t) | TOOTH POSITION AT RECEPTION TIME (0-95) | | | | TIRE WHEEL POSITION DETERMINATION LOGIC (TRUE or FALSE) | | | |
|---|---|---|---|---|---|---|---|---|---|
| | | FL | FR | RL | RR | FL | FR | RL | RR |
| RECEPTION 1 | 0.0 | 62 | 94 | 54 | 76 | — | — | — | — |
| RECEPTION 2 | 4.5 | 80 | 66 | 60 | 32 | TRUE | FALSE | TRUE | FALSE |
| RECEPTION 3 | 9.0 | 92 | 40 | 64 | 88 | FALSE | | TRUE | |

| RECEPTION | TIME (t) | TOOTH POSITION AT RECEPTION TIME (0-95) | | | | TIRE WHEEL POSITION DETERMINATION LOGIC (TRUE or FALSE) | | | |
|---|---|---|---|---|---|---|---|---|---|
| | | FL | FR | RL | RR | FL | FR | RL | RR |
| RECEPTION 1 | 0.0 | 36 | 86 | 24 | 62 | — | — | — | — |
| RECEPTION 2 | 4.5 | 0 | 6 | 74 | 64 | FALSE | TRUE | FALSE | TRUE |
| RECEPTION 3 | 8.6 | 62 | 24 | 30 | 70 | | FALSE | | TRUE |

TIRE WHEEL POSITION DETECTION DEVICE AND TIRE PRESSURE MONITORING SYSTEM HAVING THE SAME

CROSS-REFERENCE TO RELATED APPLICATIONS

This application is a U.S. National Phase Application under 35 U.S.C. 371 of International Application No. PCT/JP2016/000349 filed on Jan. 25, 2016 and published in Japanese as WO 2016/121364 A1 on Aug. 4, 2016. This application is based on and claims the benefit of priority from Japanese Patent Application No. 2015-014546 filed on Jan. 28, 2015. The entire disclosures of all of the above applications are incorporated herein by reference.

TECHNICAL FIELD

The present disclosure relates to a tire wheel position detection device for automatically detecting the position on a vehicle where a target tire wheel is mounted. The present disclosure is suitably applicable to a direct tire pressure monitoring system.

BACKGROUND ART

As a tire pressure monitoring system (hereinafter referred to as the TPMS), there is a direct TPMS. The direct TPMS is configured so that a transmitter having a pressure sensor or other sensor is directly attached to a tire wheel. Further, an antenna and a receiver are attached to a vehicle. When a detection signal outputted from the sensor is transmitted by the transmitter, the receiver receives the detection signal through the antenna to perform tire pressure detection.

When the above-mentioned direct TPMS is used, it is necessary to determine whether the transmitted data is for a subject vehicle and which tire wheel the transmitter is attached to. Therefore, the data transmitted from the transmitter includes ID information for determination as to whether the transmitted data is for the subject vehicle or for a different vehicle and which tire wheel the transmitter is attached to.

In order to identify the position of the transmitter from the ID information included in the transmitted data, it is necessary to associate the ID information of each transmitter with the position of each tire wheel and preregister the association in the receiver. For example, the ID information of a transmitter of the subject vehicle is registered by reading a barcode on the transmitter with a barcode reader and registering an ID through the barcode reader. However, the use of this method requires a barcode reader and increases the man-hours necessary for reading the barcode on the transmitter attached to each tire wheel.

The relationship between the ID information of a transmitter and the position of a tire wheel needs to be re-registered in the receiver when, for example, tire rotation is performed or tires are replaced with snow tires. This inhibits a user from freely replacing the tires. Therefore, there is a need for a system that automatically registers the ID information. In this respect, a technology for automatically registering the ID information is proposed, for example, in Patent Literature 1.

More specifically, a device described in Patent Literature 1 receives an acceleration detection signal outputted from an acceleration sensor attached to a transmitter on a tire wheel, uses the received acceleration detection signal to detect that the tire wheel is at a predetermined rotational position (rotation angle), and then causes the tire wheel to transmit a frame. When a registration procedure is accordingly performed by the user, a tire wheel velocity sensor detects the passage of teeth of a gear rotating in coordination with the tire wheel, and identifies the position of the tire wheel based on the variation in the positions of the teeth at a time point at which the frame is received.

The tire wheel position may alternatively be identified by entering an ID registration mode for registering the ID information of a transmitter, transmitting predetermined radio waves from a vehicle body to the transmitter by using a triggering device, and causing the transmitter to transmit response data to a receiver in synchronism with the radio waves. Another alternative method of identifying the tire wheel position is to attach a two-axis acceleration sensor to each transmitter, identify left and right tire wheels based on a detection signal from the two-axis acceleration sensor, and identify front and rear tire wheels based on reception strength at which a frame from each transmitter is received by the receiver. Still another alternative is to dispose an antenna in the vicinity of each tire wheel, measure the strength (RSSI) of received radio waves when the antenna receives a frame, and register a great strength value as the ID information of a tire wheel in the vicinity of the antenna.

PRIOR ART LITERATURE

Patent Literature

Patent Literature 1: JP-5585595B

SUMMARY OF INVENTION

When the above-mentioned ID information of a transmitter is to be automatically registered, all the ID informations included in the received frames are handled as ID information candidates for registration (hereinafter referred to as candidate IDs), and then the ID information of the transmitter on the subject vehicle is selected from among the candidate IDs. Therefore, the candidate IDs are stored in a memory of a TPMS-ECU, then the ID information of the transmitter on the subject vehicle is selected from among the candidate IDs, and the selected ID information is eventually registered in association with a tire wheel.

However, the ID information of a transmitter on a different vehicle may be erroneously identified as the ID information of a transmitter on the subject vehicle. Such a situation may arise if a frame from the transmitter on the different vehicle is received before the reception of a frame from the transmitter on the subject vehicle and no frame is received from the transmitter on the subject vehicle for an extended period of time. Particularly, if a frame from the transmitter on the different vehicle is registered as the candidate IDs in a situation where no frame is received from the transmitter on the subject vehicle, the positions of the teeth concerning the registered candidate IDs may soon vary greatly at a time point of frame reception. Therefore, there is a possibility that ID information having small variation in the positions of the teeth is accidentally selected from among the candidate IDs and identified as the ID information of the transmitter on the subject vehicle. In such an instance, it is undesirable to readily fix the ID information as the ID information of the transmitter on the subject vehicle.

Meanwhile, even when the above-described alternative methods are used, a problem similar to the above may arise because the ID information of the transmitter on the different vehicle may be erroneously registered as the ID information of the transmitter on the subject vehicle. Further, the method of using the triggering device requires the use of a triggering device that needs to be installed as an additional part. Furthermore, the method of using the two-axis acceleration sensor requires the use of a two-axis acceleration sensor that needs to be installed as a highly functional additional part. Moreover, the method of disposing the antenna in the vicinity of each tire wheel requires the use of an antenna that needs to be installed for each tire wheel. This results in an increase in the number of parts, and thus causes a cost increase.

In view of the above circumstances, an object of the present disclosure is to provide a tire wheel position detection device that is capable of registering ID information of a transmitter on a subject vehicle with increased accuracy. Another object is to provide a tire pressure monitoring system having such a tire wheel position detection device.

A tire wheel position detection device in a first aspect of the present disclosure is applied to a vehicle having a vehicle body equipped with a plurality of tire wheels each having a tire and comprises: a transmitter attached to each of the tire wheels and including a first controller that creates and transmits a frame including unique identification information; and a receiver attached to the vehicle body and including a second controller that performs tire wheel position detection through receiving the frames transmitted from the transmitters through a reception antenna, and thereafter, selecting, from the identification informations included in the frames, candidate identification informations indicating candidates to be registered, and identifying, from the candidate identification informations, the candidate identification informations that match the transmitters attached to the tire wheels of the vehicle, and storing the tire wheels and the identification informations of the transmitters attached to the tire wheels in association with each other. The transmitter includes an acceleration sensor that outputs a detection signal based on acceleration including a gravitational acceleration component, the gravitational acceleration component being varied by rotation of the tire wheel attached with the transmitter. The first controller of the transmitter detects an angle of the transmitter based on the gravitational acceleration component included in the detection signal of the acceleration sensor and repeatedly transmits the frame at time points at which the angle is a predetermined transmission angle where an arbitrary circumferential position of the tire wheel that is centered with respect to a central axis of the tire wheel attached with the transmitter is an angle of 0 degrees. The second controller of the receiver performs the tire wheel position detection through: acquiring gear information indicative of tooth positions of gears based on detection signals of tire wheel velocity sensors, the tire wheel velocity sensors detecting passage of teeth of the gears rotating in coordination with the tire wheels, each gear having a circumferential surface with the tooth portions and portions between the tooth portions to alternately exhibit different magnetoresistance values, the tooth portions being conductive bodies; setting a permissible range of variation based on the tooth positions at a time point of reception of the frame; when the tooth positions at a time point of reception of the frame after the setting of the permissible range of variation are outside the permissible range of variation, eliminating the tire wheel from tire wheel candidates attached with the transmitter having transmitted the frame; and identifying and registering a remaining tire wheel as the tire wheel attached with the transmitter having transmitted the frame. The second controller includes: a provisional fixer that, before the registration, makes a provisional fixing of each individual candidate identification information when the tire wheel attached with the transmitter having transmitted the frame is identified based on the tooth positions being within the permissible range of variation; a post-provisional-fixing determiner that, after the provisional fixing, determines whether the tooth positions at a time point of reception of the frame including the provisionally fixed candidate identification information are within the permissible range of variation; a counter that, after the provisional fixing, measures the number of receptions of the frame including the provisionally fixed candidate identification information at which the tooth positions continue to remain within the permissible range of variation; a first determiner that determines whether the number of receptions is equal to or greater than a first predetermined value; and a register that, when the number of receptions is equal to or greater than the first predetermined value, definitely determines and registers the provisionally fixed candidate identification information as the identification information of the identified tire wheel.

As described above, even when the candidate identification information is identified as the identification information of the transmitter on one of the tire wheels of the subject vehicle at the time of tire wheel position detection, the identified candidate identification information is not immediately determined and registered. At first, the identified candidate identification information is provisionally fixed. When the identified candidate identification information is found to be relatively accurate, it is determined and registered. Thus, relatively accurate candidate identification information can be registered as the identification information of the transmitter on each tire wheel of the subject vehicle. This inhibits the identification information of a transmitter on a different vehicle from being erroneously identified as the identification information of a transmitter on the subject vehicle.

A tire wheel position detection device in a second aspect of the present disclosure is applied to a vehicle having a vehicle body equipped with a plurality of tire wheels each having a tire comprises: the tire wheel position detection device comprising: a transmitter attached to each of the tire wheels and including a first controller that creates and transmits a frame including unique identification information; and a receiver attached to the vehicle body and including a second controller that performs tire wheel position detection through: receiving the frames transmitted from the transmitters through a reception antenna, and thereafter selecting, from the identification informations included in the frame, candidate identification informations indicating candidates to be registered, and identifying, from the candidate identification informations, the candidate identification informations that match the transmitters attached to the tire wheels of the vehicle, and storing the tire wheels and the identification informations of the transmitters attached to the tire wheels in association with each other. The transmitter includes an acceleration sensor that outputs a detection signal based on acceleration including a gravitational acceleration component, the gravitational acceleration component being varied by rotation of the tire wheel attached with the transmitter. The first controller of the transmitter detects an angle of the transmitter based on the gravitational acceleration component included in the detection signal of the acceleration sensor and repeatedly transmits the frame at time points at which the angle is a predetermined transmission angle where an arbitrary circumferential position of the tire wheel that is centered with respect to the central axis of the tire wheel attached with the transmitter is an angle of 0 degrees. The second controller of the receiver performs the tire wheel position detection through: acquiring gear information indicative of tooth positions of gears based on detection signals of tire wheel velocity sensorsdetecting passage of teeth of the gears rotating in coordination with the tire wheels, each gear having a circumferential surface with tooth portions and portions between the teeth t to alternately exhibit different magnetoresistance values, the tooth portions being conductive bodies; setting a permissible range of variation based on the tooth positions at a time point of reception of the frame; when the tooth positions at a time point of reception of the frame after the setting of the permissible range of variation are outside the permissible range of variation, eliminating the tire wheel from tire wheel candidates attached with the transmitter having transmitted the frame; and identifying and registering a remaining tire wheel as the tire wheel attached with the transmitter having transmitted the frame. The second controller includes: a provisional fixer that, before the registration, makes a provisional fixing of each individual candidate identification information when the tire wheel attached with the transmitter having transmitted the frame is identified based on the tooth positions being within the permissible range of variation; a post-provisional-fixing determiner that, after the provisional fixing, determines whether the tooth positions at a time point of reception of the frame including the provisionally fixed candidate identification information are within the permissible range of variation; a counter that, after the provisional fixing, measures the number of receptions of the frame including the provisionally fixed candidate identification information at which the tooth positions continue to remain within the permissible range of variation; a count difference determiner that, when a plurality of the provisionally fixed candidate identification informations exist, determines whether a difference between the greatest number of receptions and the second greatest number of receptions among the respective numbers of receptions of the frames including the provisionally fixed candidate identification informations, is equal to or greater than a predetermined value; and a register that, when the difference is determined to be equal to or greater than the predetermined value, definitely determines and registers the candidate identification information exhibiting the greatest number of receptions as the identification information of the identified tire wheel.

As described above, when a plurality of candidate identification informations of a tire wheel are provisionally fixed, one of the candidate identification informations is identified as correct identification information of a transmitter on the tire wheel based on the difference in the number of receptions of the candidate identification information, or more specifically, the difference in the number of receptions between the greatest number of receptions and the second greatest number of receptions. Thus, relatively accurate candidate identification information can be registered as the identification information of the transmitter on each tire wheel of the subject vehicle. This inhibits the identification information of a transmitter on a different vehicle from being erroneously identified as the identification information of a transmitter on the subject vehicle.

BRIEF DESCRIPTION OF DRAWINGS

The above and other objects, features, and advantages of the present disclosure will become more apparent from the following detailed description made with reference to the accompanying drawings. In the drawings:

FIG. 6A is a table illustrating the result of tire wheel position evaluation of ID 1;

FIG. 6B is a table illustrating the result of tire wheel position evaluation of ID 2;

FIG. 6C is a table illustrating the result of tire wheel position evaluation of ID 3;

FIG. 6D is a table illustrating the result of tire wheel position evaluation of ID 4;

DESCRIPTION OF EMBODIMENTS

Figure 1:
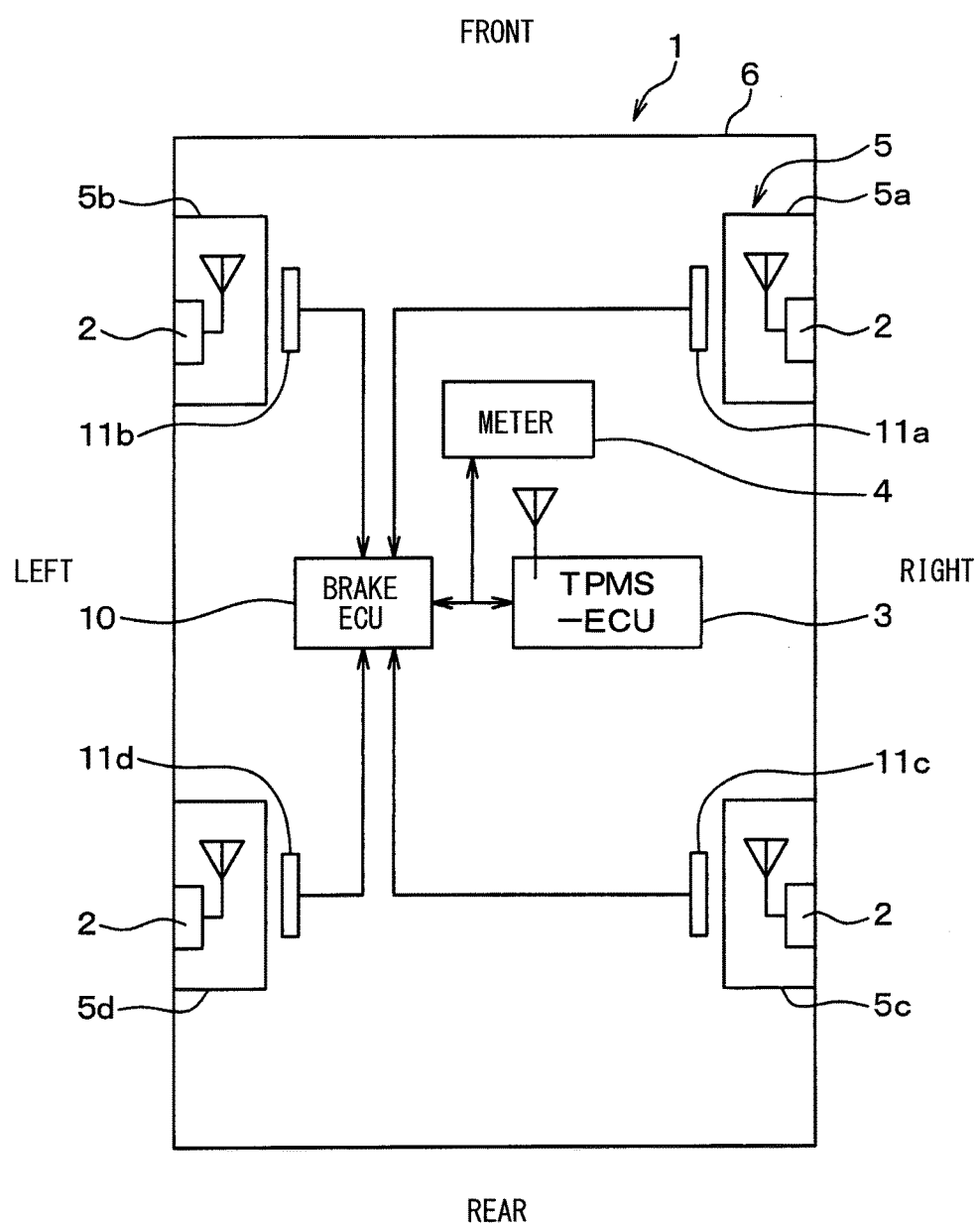
FIG. 1 is a diagram illustrating an overall configuration of a tire pressure monitoring system to which a tire wheel position detection device according to a first embodiment is applied.

Embodiments of the present disclosure will now be described with reference to the accompanying drawings. In the following description of individual embodiments, identical or equivalent elements are designated by the same reference numerals.

(First Embodiment)

A first embodiment of the present disclosure will now be described with reference to the accompanying drawings. FIG. 1 is a diagram illustrating an overall configuration of a TPMS to which a tire wheel position detection device according to the first embodiment is applied. The upward direction in FIG. 1 corresponds to the forward direction of a vehicle 1, and the downward direction in FIG. 1 corresponds to the rearward direction of the vehicle 1. The TPMS according to the present embodiment will be described below with reference to FIG. 1.

As illustrated in FIG. 1, the TPMS, which is mounted in the vehicle 1, includes transmitters 2, a TPMS-ECU 3, and a meter 4. The TPMS-ECU 3 is an ECU for the TPMS and adapted to function as a receiver. The tire wheel position detection device identifies tire wheel positions by using the transmitters 2 and TPMS-ECU 3 included in the TPMS and acquiring gear information from a brake control ECU (hereinafter referred to as the brake ECU) 10. The gear information is derived from detection signals of tire wheel velocity sensors 11a-11d provided for tire wheels 5 (5a-5d).

As illustrated in FIG. 1, the transmitters 2 are attached to the tire wheels 5a-5d. The transmitters 2 detect the pressures of tires attached to the tire wheels 5a-5d, store tire pressure information indicative of the result of detection and ID information specific to each transmitter 2 in a frame, and transmit the frame. Meanwhile, the TPMS-ECU 3 is mounted on a vehicle body 6 of the vehicle 1. The TPMS-ECU 3 receives the frame transmitted from each transmitter 2 and achieves tire wheel position detection and tire pressure detection by performing, for example, various processes and calculations based on a detection signal stored in the frame.

Figure 2A:
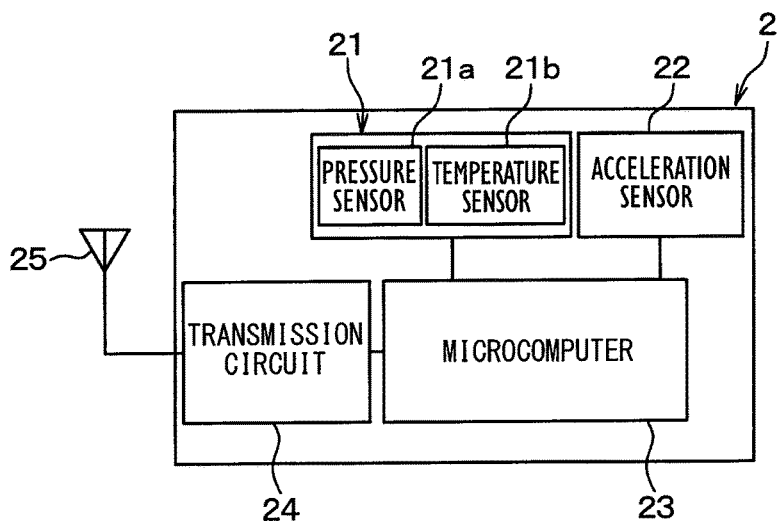
FIG. 2A is a block diagram illustrating a configuration of a transmitter.
Figure 2B:
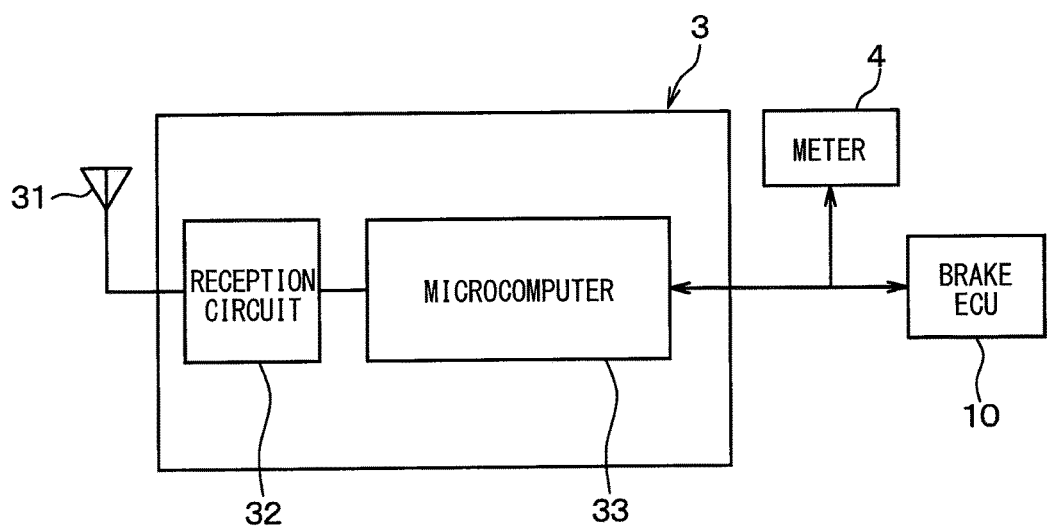
FIG. 2B is a block diagram illustrating a configuration of a TPMS-ECU 3.

The transmitters 2 create a frame, for example, by FSK (frequency-shift keying). The TPMS-ECU 3 demodulates the frame to read data in the frame, and performs tire wheel position detection and tire pressure detection. FIGS. 2A and 2B are block diagrams illustrating configurations of the transmitters 2 and TPMS-ECU 3.

As illustrated in FIG. 2A, the transmitters 2 each include a sensing section 21, an acceleration sensor 22, a microcomputer 23, a transmission circuit 24, and a transmission antenna 25. These elements are driven by electrical power supplied from a battery (not shown).

The sensing section 21 includes, for example, a diaphragm pressure sensor 21a and a temperature sensor 21b. The sensing section 21 outputs a detection signal based on tire pressure and a detection signal based on temperature. The acceleration sensor 22 is used to detect its position on the tire wheels 5a-5d attached with the transmitters 2, that is, detect the positions of the transmitters 2 and the speed of the vehicle. The acceleration sensor 22 in the present embodiment outputs a detection signal based on acceleration that is exerted on the tire wheels 5a-5d during their rotation and exerted in both radial directions perpendicular to circumferential directions.

The microcomputer 23 is of a well-known type that includes, for example, a controller (first controller). The microcomputer 23 performs a predetermined process in compliance with a program stored in a memory of the controller. The memory of the controller stores individual ID information that includes transmitter-specific identification information for identifying the transmitters 2 and vehicle-specific identification information for identifying a subject vehicle.

The microcomputer 23 receives a detection signal about tire pressure from the sensing section 21, subjects the detection signal to signal processing, reprocesses the result of signal processing as needed, and stores the resulting tire pressure information in a frame together with the ID information of each transmitter 2. Further, the microcomputer 23 monitors the detection signal of the acceleration sensor 22, detects the position (angle) of a transmitter 2 on the tire wheel 5a-5d to which the transmitter 2 is attached, and detects the speed of the vehicle. When a frame is created, the microcomputer 23 transmits the frame (data) from the transmission antenna 25 to the TPMS-ECU 3 through the transmission circuit 24 based on the result of transmitter position detection and on the result of vehicle speed detection.

More specifically, when the vehicle 1 is traveling, the microcomputer 23 initiates frame transmission. The microcomputer 23 repeats frame transmission at a time point at which the detection signal of the acceleration sensor 22 indicates that the acceleration sensor 22 is at a predetermined angle. Whether the vehicle 1 is traveling is determined based on the result of vehicle speed detection. The angle of the acceleration sensor 22 is determined based on the result of transmitter position detection that is derived from the detection signal of the acceleration sensor 22.

That is to say, the microcomputer 23 detects the vehicle speed by using the detection signal of the acceleration sensor 22. When the vehicle speed is equal to or higher than a predetermined speed (e.g., 5 km/h), the microcomputer 23 determines that the vehicle 1 is traveling. The output from the acceleration sensor 22 includes acceleration based on centrifugal force (centrifugal acceleration). The vehicle speed can be calculated by integrating the centrifugal acceleration and multiplying the result of integration by a coefficient. Therefore, the microcomputer 23 eliminates a gravitational acceleration component from the output generated by the acceleration sensor 22 to determine the centrifugal acceleration, and then calculates the vehicle speed based on the centrifugal acceleration.

Further, as the acceleration sensor 22 outputs a detection signal based on the rotation of each tire wheel 5a-5d, the detection signal includes the gravitational acceleration component while the vehicle 1 is traveling. Thus, the detection signal has an amplitude based on tire wheel rotation. For example, the amplitude of the detection signal is a negative maximum amplitude when the transmitter 2 is positioned above the central axis of the tire wheel 5a-5d, zero when the transmitter 2 is flush with the central axis, and a positive maximum amplitude when the transmitter 2 is positioned below the central axis. Therefore, the position of the acceleration sensor 22 can be detected based on the amplitude. Additionally, the angle at which the transmitter 2 is positioned, that is, the angle formed by the acceleration sensor 22, can be determined on the assumption that the angle formed by the acceleration sensor 22 is 0° when, for example, the acceleration sensor 22 is positioned above the central axis of the tire wheel 5a-5d.

Consequently, each transmitter 2 initiates frame transmission the moment the predetermined vehicle speed is reached or when the acceleration sensor 22 is positioned at the predetermined angle after the predetermined vehicle speed is reached. Frame transmission is then repeated at a time point at which the angle formed by the acceleration sensor 22 is equal to an angle at which the first frame transmission is performed. The frame transmission may be performed each time the angle formed by the acceleration sensor 22 is equal to the angle at which the first frame transmission is performed. In consideration of battery life, however, it is preferable that the frame transmission be performed, for example, at predetermined time intervals (e.g., at 15-second intervals) without constantly performing the frame transmission each time the above-mentioned angle is reached.

The transmission circuit 24 functions as an output section that transmits a frame transmitted from the microcomputer 23 to the TPMS-ECU 3 through the transmission antenna 25. For example, RF band radio waves are used for frame transmission.

The transmitter 2 configured as described above is attached, for example, to an air injection valve of each tire wheel 5a-5d, and disposed so that the sensing section 21 is exposed to the inside of a tire. The transmitter 2 detects the tire pressure of a tire wheel attached with the transmitter 2. When the predetermined vehicle speed is exceeded as mentioned above, the transmitter 2 repeatedly performs frame transmission through the transmission antenna 25 attached to the transmitter 2 at a time point at which the predetermined angle is reached by the acceleration sensor 22 on each tire wheel 5a-5d. Subsequently, the transmitter 2 may successively perform frame transmission at a time point at which the predetermined angle is reached by the acceleration sensor 22 on each tire wheel 5a-5d. However, the transmission intervals should be increased in consideration of battery life. Therefore, when a period of time presumably required for tire wheel position detection is elapsed, a tire wheel position determination mode is superseded by a periodical transmission mode. In the periodical transmission mode, the frame transmission is performed at longer fixed time intervals (e.g., at 1-minute intervals) in order to periodically transmit a signal about tire pressure to the TPMS-ECU 3. In this instance, for example, a random delay can be set for each transmitter 2 to delay the transmission timing of each transmitter 2. This avoids a situation where the TPMS-ECU 3 is unable to receive signals from a plurality of transmitters 2 due to radio wave interference.

As illustrated in FIG. 2B, the TPMS-ECU 3 includes a reception antenna 31, a reception circuit 32, and a microcomputer 33. The TPMS-ECU 3 acquires a gear position, which is indicated by the number of tooth edges (or the number of teeth) of a gear rotating together with each tire wheel 5a-5d, by acquiring the gear information from the brake ECU 10 as described later through an in-vehicle LAN such as a CAN.

The reception antenna 31 is used to receive a frame transmitted from each transmitter 2. The reception antenna 31 is secured to the vehicle body 6, and may be an internal antenna disposed in the body of the TPMS-ECU 3 or an external antenna wire-connected to the body of the TPMS-ECU 3.

The reception circuit 32 functions as an input section that inputs a frame received from each transmitter 2 through the reception antenna 31 and delivers the frame to the microcomputer 33. Upon receipt of a signal (frame) through the reception antenna 31, the reception circuit 32 conveys the received signal to the microcomputer 33.

The microcomputer 33 corresponds to a second controller, and performs tire wheel position detection in compliance with a program stored in a memory of the microcomputer 33. More specifically, the microcomputer 33 performs tire wheel position detection based on the relationship between information acquired from the brake ECU 10 and a time point at which a frame transmitted from each transmitter 2 is received. Tire wheel velocity information of each tire wheel 5a-5d and gear information of each tire wheel velocity sensor 11a-11d provided for each tire wheel 5a-5d are acquired from the brake ECU 10 at predetermined time intervals (e.g., at 10-millisecond intervals).

The gear information indicates the positions of teeth of a gear that rotates together with each tire wheel 5a-5d. The tire wheel velocity sensors 11a-11d, which are each formed, for example, of an electromagnetic pickup sensor disposed to face the teeth of the gear, vary their detection signals based on the passage of teeth of the gear. Detection signals outputted from the tire wheel velocity sensors 11a-11d of this type are square pulse waves based on the passage of teeth. Therefore, the rise and fall of the square pulse waves indicate the passage of the tooth edges of the gear. Therefore, the brake ECU 10 determines the number of tooth edges of the gear from the number of rises and falls of the detection signal of each tire wheel velocity sensor 11a-11d, that is, counts the number of tooth edge passages, and conveys, at predetermined time intervals, the current number of tooth edges to the microcomputer 33 as the gear information indicative of tooth positions. This enables the microcomputer 33 to determine a time point at which a particular tooth of the gear passes.

The number of tooth edges is reset upon each rotation of the gear. For example, if the gear has 48 teeth, a total of 96 tooth edges (tooth edges 0 to 95) are counted. When the count reaches 95, it resets back to 0 (zero) and resumes counting.

Here, it is assumed that the number of tooth edges of the gear is conveyed as the gear information from the brake ECU 10 to the microcomputer 33. Alternatively, however, the number of teeth, which is the count of tooth passages, may be conveyed as the gear information. Another alternative is to convey the number of tooth edges or teeth that have passed during a predetermined period of time to the microcomputer 33, let the microcomputer 33 add the number of tooth edges or teeth that have passed during the predetermined of time to the number of tooth edges or teeth that have previously passed, and permit the microcomputer 33 to count the number of tooth edges or teeth in such a cycle. That is to say, the microcomputer 33 should be able to eventually acquire the number of tooth edges or teeth as the gear information in such a cycle. Although the brake ECU 10 resets the number of tooth edges (or teeth) of the gear each time power is turned off, the brake ECU 10 resumes measurement the moment the power is turned back on or when a predetermined vehicle speed is reached after power on. Accordingly, even if a reset is performed each time the power is turned off, the same teeth are expressed by the same number of tooth edges (or teeth) while the power is on.

The microcomputer 33 measures the frame reception timing upon receipt of a frame transmitted from each transmitter 2, and performs tire wheel position detection based on the number of tooth edges (or teeth) of the gear at the frame reception timing, which is included in acquired information of the number of tooth edges (or teeth) of the gear. Consequently, tire wheel position detection can be performed to determine which tire wheel 5a-5d each transmitter 2 is attached to. A concrete method for tire wheel position detection will be described in detail later.

Further, based on the result of tire wheel position detection, the microcomputer 33 stores the association between the ID information of each transmitter 2 and the position of a tire wheel 5a-5d attached with each transmitter 2. Subsequently, based on the ID information and tire pressure data stored in a frame transmitted from each transmitter 2, the microcomputer 33 detects the tire pressure of each tire wheel 5a-5d and outputs an electrical signal corresponding to the detected tire pressure to the meter 4 through an in-vehicle LAN such as a CAN. For example, the microcomputer 33 compares the tire pressure with a predetermined threshold value Th to detect a decrease in the tire pressure. Upon detection of a decrease in the tire pressure, the microcomputer 33 outputs a signal indicative of the decrease in the tire pressure to the meter 4. In this manner, the meter 4 is notified which of the four tire wheels 5a-5d has experienced a decrease in the tire pressure.

The meter 4 functions as an alarm. As illustrated in FIG. 1, the meter 4 is positioned to be visible to a driver of the vehicle 1 and formed, for example, of a meter display mounted on an instrument panel of the vehicle 1. When, for instance, a signal indicative of a decrease in the tire pressure is transmitted from the microcomputer 33 in the TPMS-ECU 3, the meter 4 reports the decrease in the tire pressure of a particular tire wheel to the driver by displaying information indicative of the decrease in the tire pressure while identifying the affected one of the tire wheels 5a-5d.

Operations of the TPMS according to the present embodiment will now be described. The following description of TPMS operations is divided into two, one for tire wheel position detection in the TPMS and the other for tire pressure detection in the TPMS. First of all, a concrete method for tire wheel position detection will be described with reference to FIGS. 3 to 6D.

The transmitter 2 detects the vehicle speed and the angle of the acceleration sensor 22 on each tire wheel 5a-5d by allowing the microcomputer 23 to monitor the detection signal of the acceleration sensor 22 at predetermined sampling intervals based on power supply from the battery. When the predetermined vehicle speed is reached, the microcomputer 23 repeatedly performs frame transmission at a time point at which the predetermined angle is reached by the acceleration sensor 22. Each transmitter 2 starts to perform frame transmission at a time point at which, for example, the predetermined vehicle speed is reached or the predetermined angle is reached by the acceleration sensor 22 after the predetermined vehicle speed is reached. Then, at a time point at which the angle formed by the acceleration sensor 22 becomes equal to the angle at the first frame transmission, each transmitter 2 repeatedly performs frame transmission.

Figure 3:
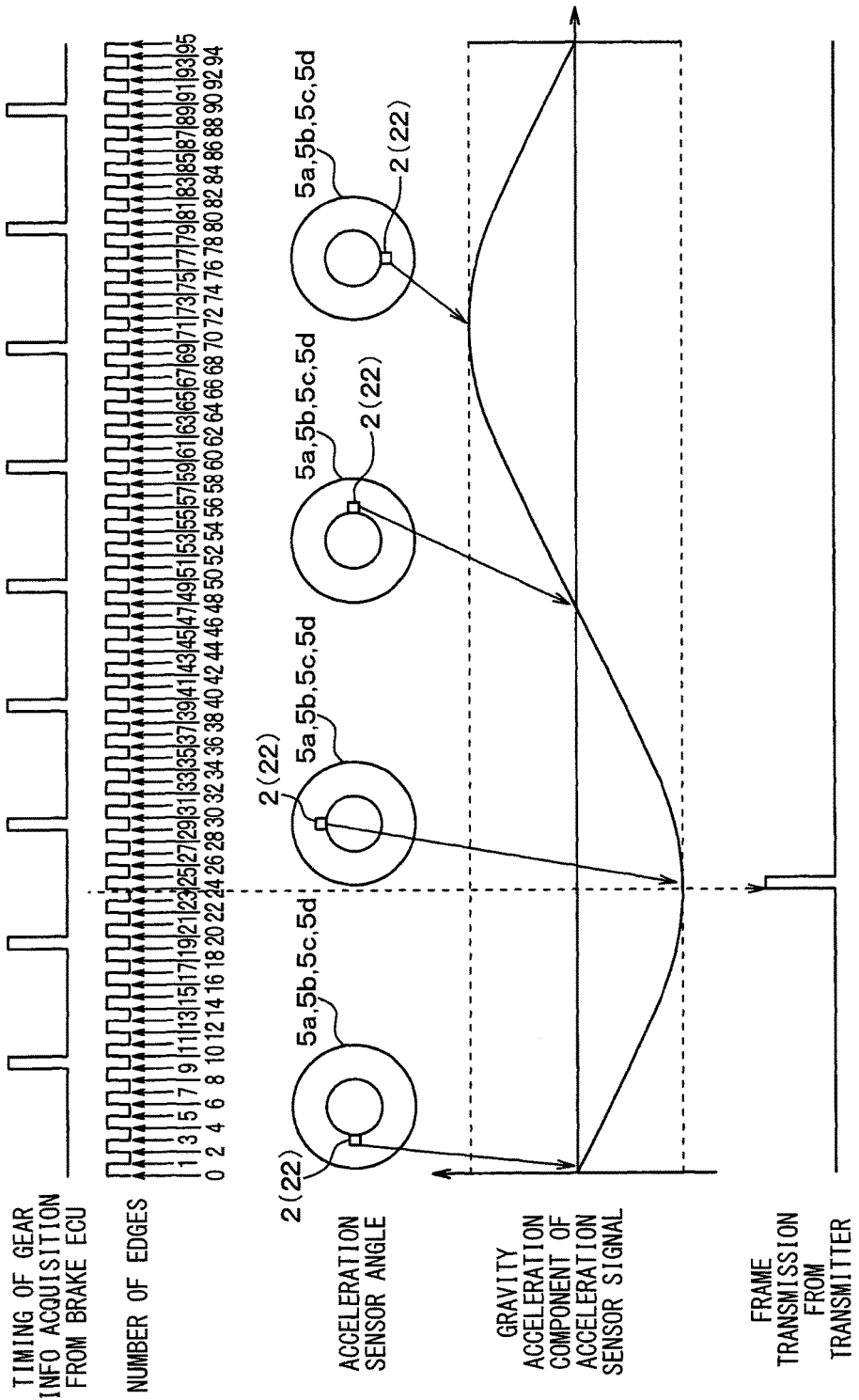
FIG. 3 is a timing diagram illustrating how tire wheel position detection is performed.

The gravitational acceleration component extracted from the detection signal of the acceleration sensor 22 is a sine wave depicted in FIG. 3. The angle of the acceleration sensor 22 can be determined from the sine wave. Therefore, the frame transmission is performed at a time point at which the sine wave indicates that the acceleration sensor 22 is at the same angle.

Meanwhile, the TPMS-ECU 3 acquires the gear information of the tire wheel velocity sensors 11a-11d provided for the tire wheels 5a-5d from the brake ECU 10 at predetermined intervals (e.g., at 10-millisecond intervals). Upon receipt of a frame from each transmitter 2, the TPMS-ECU 3 measures the frame reception timing, and acquires the number of tooth edges (or teeth) of the gear at the frame reception timing from among the acquired gear information indicative of the number of tooth edges (or teeth) of the gear.

In the above instance, the frame reception timing of a frame transmitted from each transmitter 2 does not always agree with the cycle of gear information acquisition from the brake ECU 10. Therefore, the number of gear tooth edges (or gear teeth) indicated by the gear information acquired in a cycle nearest to, that is, immediately before or after, the frame reception timing among the cycles of gear information acquisition from the brake ECU 10 can be used as the number of gear tooth edges (or gear teeth) at the frame reception timing. Alternatively, the number of gear tooth edges (or gear teeth) at the frame reception timing may be calculated by using the number of gear tooth edges (or gear teeth) indicated by the gear information acquired in a cycle immediately before or after the frame reception timing among the cycles of gear information acquisition from the brake ECU 10. For example, an intermediate value of the number of gear tooth edges (or gear teeth) indicated by the gear information acquired in a cycle immediately before or after the frame reception timing may be used as the number of gear tooth edges (or gear teeth) at the frame reception timing.

The above-described operation for acquiring the number of gear tooth edges (or gear teeth) at the frame reception timing is repeated upon each receipt of a frame in order to perform tire wheel position detection based on the number of gear tooth edges (or gear teeth) at a time point at which an acquired frame is received. More specifically, the tire wheel position detection is performed by determining whether the variation in the number of gear tooth edges (or gear teeth) at the frame reception timing is within a predetermined range based on the number of gear tooth edges (or gear teeth) at the last time point of frame reception.

As regards a tire wheel from which a frame is received, the frame is transmitted at a time point at which the predetermined angle is reached by the acceleration sensor 22. Therefore, the tooth positions indicated by the number of gear tooth edges (or gear teeth) at the frame reception timing substantially agree with the last tooth positions. Consequently, the variation in the number of gear tooth edges (or gear teeth) at the frame reception timing is small and confined within the predetermined range. This also holds true when frame reception occurs multiple times. The variation in the number of gear tooth edges (or gear teeth) at each frame reception timing is within the predetermined range, which is determined at the first frame reception timing. Meanwhile, as regards a tire wheel other than the tire wheel from which a frame is received, the tooth positions indicated by the number of gear tooth edges (or gear teeth) at the frame reception timing of a frame transmitted from a transmitter 2 on another tire wheel vary.

That is to say, as the gears of the tire wheel velocity sensors 11a-11d rotate in coordination with the tire wheels 5a-5d, the tooth positions of a tire wheel from which a frame is received substantially agree with the tooth positions indicated by the number of gear tooth edges (or gear teeth) at the frame reception timing. However, the rotations of the tire wheels 5a-5d vary due to road conditions and turning or lane changes, for instance. Therefore, the rotations of the tire wheels 5a-5d cannot be completely identical with each other. Thus, as regards a tire wheel other than the tire wheel from which a frame is received, the tooth positions indicated by the number of gear tooth edges (or gear teeth) at the frame reception timing vary.

Figure 4:
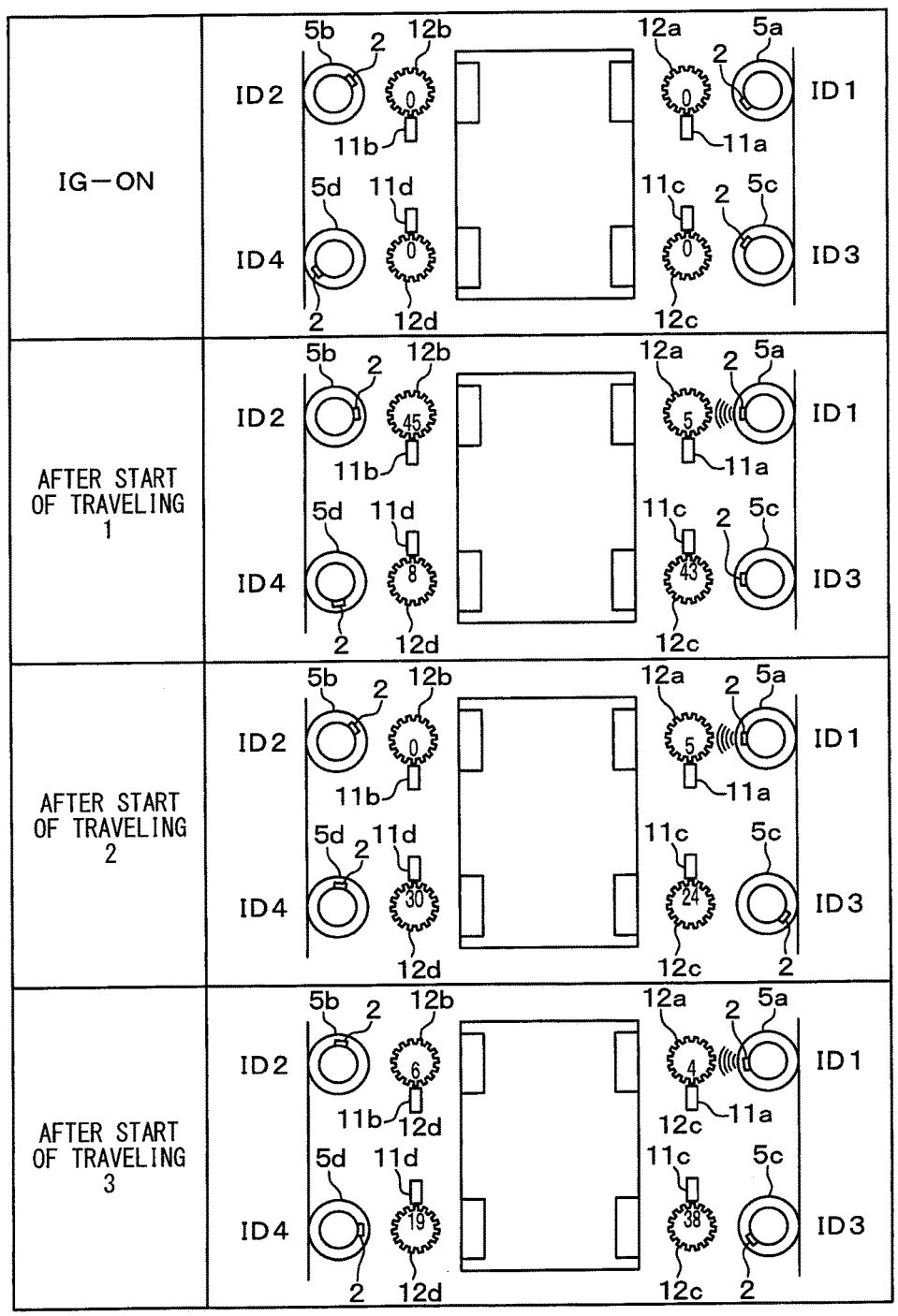
FIG. 4 is an image diagram illustrating changes in gear information.

Consequently, as regards a tire wheel other than the tire wheel from which frames are gradually received after the start of traveling in a state where the number of tooth edges of gears 12a-12d is initially 0 (zero) when an ignition switch (IG) is turned on, the tooth positions indicated by the number of gear tooth edges (or gear teeth) at the frame reception timing vary as illustrated in FIG. 4. Tire wheel position detection is performed by determining whether the variation is within the predetermined range.

Figure 5A:
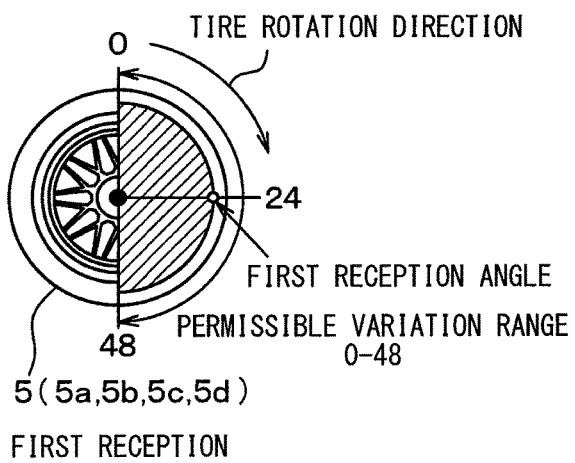
FIG. 5A is a schematic diagram illustrating a tire wheel position determination logic.
Figure 5B:
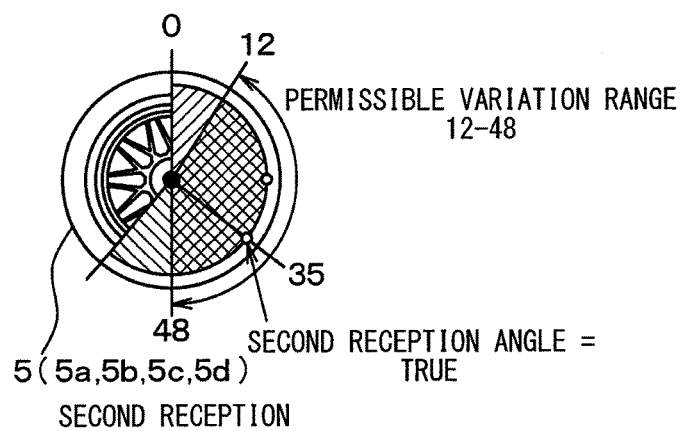
FIG. 5B is a schematic diagram illustrating a tire wheel position determination logic.

It is assumed, for example, that the transmitter 2 is positioned at a first reception angle at the time of first frame transmission as illustrated in FIG. 5A. It is also assumed that a permissible range of variation, which is a range within which the variation in the number of gear tooth edges (or gear teeth) is permissible, is a value within a range of 180 degrees centered with respect to the first reception angle (a range of the first reception angle plus/minus 90 degrees). When it comes to the number of tooth edges, the range is assumed to be a range of the number of tooth edges plus/minus 24 centered with respect to the number of tooth edges at the time of first reception. When it comes to the number of teeth, the range is assumed to be a range of the number of teeth plus/minus 12 centered with respect to the number of teeth at the time of first reception. In this situation, as illustrated in FIG. 5B, when the number of gear tooth edges (or gear teeth) at the time of second frame reception is within the permissible range of variation that is determined by the first frame reception, a tire wheel exhibiting that number of gear tooth edges (or gear teeth) may coincide with the tire wheel from which the frame is transmitted. In this case, a TRUE (correct) result is obtained.

However, even in the above case, the permissible range of variation is set centrally with respect to the second reception angle, which is the angle of the transmitter 2 at the time of second frame reception. Thus, the permissible range of variation corresponds to an angle of 180 degrees (±90 degrees) centered with respect to the second reception angle. Therefore, an overlap between the permissible range of variation of 180 degrees (±90 degrees) centered with respect to the first reception angle, which is the previous permissible range of variation, and the permissible range of variation of 180 degrees (±90 degrees) centered with respect to the second reception angle becomes a new permissible range of variation (the number of tooth edges ranges from 12 to 48). The new permissible range of variation can be narrowed down to such an overlap range.

Figure 5C:
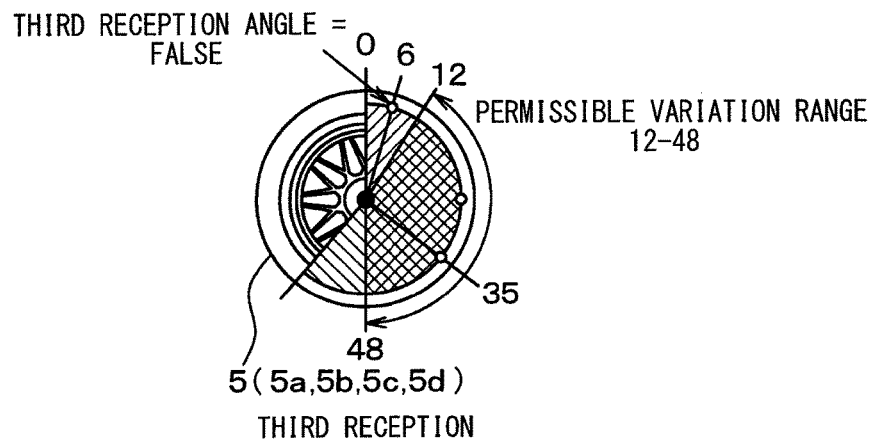
FIG. 5C is a schematic diagram illustrating a tire wheel position determination logic.

Therefore, as illustrated in FIG. 5C, when the number of gear tooth edges (or gear teeth) at the time of third frame reception is outside the permissible range of variation that is determined by the first and second frame receptions, a tire wheel exhibiting that number of gear tooth edges (or gear teeth) does not coincide with the tire wheel from which the frame is transmitted. In this case, a FALSE (erroneous) result is obtained. In the above instance, even if the number of gear tooth edges (or gear teeth) at the time of third frame reception is within the permissible range of variation that is determined by the first frame reception, the result is determined to be FALSE when the number of gear tooth edges (or gear teeth) at the time of third frame reception is outside the permissible range of variation that is determined by the first and second frame receptions. This makes it possible to determine which of the tire wheels 5a-5d the transmitter 2 having transmitted the received frame is attached to.

That is to say, as illustrated in FIG. 6A, the number of gear tooth edges (or gear teeth) is acquired from a frame having ID 1 as the ID information at each time point at which such a frame is received, and the acquired information is stored for each associated tire wheel (front left tire wheel FL, front right tire wheel FR, rear left tire wheel RL, rear right tire wheel RR). Each time the frame is received, it is determined whether the acquired number of gear tooth edges (or gear teeth) is within the permissible range of variation, and a tire wheel determined to be outside that range is eliminated from tire wheel candidates attached with the transmitter 2 having transmitted the frame. Eventually, a tire wheel that is left uneliminated is registered as the tire wheel attached with the transmitter 2 having transmitted the frame. If the frame includes ID 1, the front right tire wheel FR, the rear right tire wheel RR, and the rear left tire wheel RL are eliminated in sequence from the candidates, and the eventually remaining front left tire wheel FL is registered in association with the ID information as the tire wheel attached with the transmitter 2 having transmitted the frame.

As illustrated in FIGS. 6B to 6D, frames having IDs 2 to 4 as the ID information are processed in the same manner as the frame having ID 1. Consequently, tire wheels attached with transmitters 2 having transmitted the frames can be identified. Accordingly, all the four tire wheels attached with the transmitters 2 can be identified.

In the manner described above, it is determined which one of the tire wheels 5a-5d each frame is attached to. Then, the microcomputer 33 stores the ID information of each of the transmitters 2 having transmitted the frames in association with the position of the tire wheel attached with each transmitter 2.

Incidentally, the TPMS-ECU 3 receives a frame that is transmitted when a predetermined vehicle speed is reached, and stores the gear information obtained at a time point of such frame reception. However, when the vehicle speed is equal to or lower than a predetermined travel halt determining speed (e.g., 5 km/h), the TPMS-ECU 3 discards preceding gear information. Subsequently, when the vehicle starts traveling again, tire wheel position detection is performed anew in the above manner.

Basic tire wheel position detection is performed by the above method. Therefore, the positions of the tire wheels, namely, the front left tire wheel FL, the front right tire wheel FR, the rear left tire wheel RL, and the rear right tire wheel RR, can be detected. If a frame transmitted from a different vehicle is received during tire wheel position detection, the ID information stored in that frame can be a candidate ID. That is to say, when tire wheel position detection is performed, all ID information included in received frames is basically handled as candidate IDs, and a transmitter 2 on the subject vehicle is selected from among such candidate IDs. Accordingly, the candidate IDs are stored in the memory of the TPMS-ECU 3, and a transmitter 2 on the subject vehicle is eventually selected from among the stored candidate IDs and registered. Under normal conditions, however, while a tire wheel position determination logic is used to determine the tire wheel position, a time point at which a frame transmitted from a transmitter on a different vehicle is received does not agree with the gear tooth positions of the tire wheels 5a-5d of the subject vehicle. Consequently, only the ID information of a transmitter 2 on the subject vehicle is registered while avoiding the registration of the ID information of a transmitter on a different vehicle.

Under normal conditions, processing is performed based on the tire wheel position determination logic so that the ID information of a transmitter on a different vehicle is outside the permissible range of variation. However, the ID information of a transmitter on a different vehicle may be erroneously identified as the ID information of a transmitter 2 on the subject vehicle. This situation may arise if, for example, no frame is received from a transmitter 2 on the subject vehicle for an extended period of time so that a frame from a transmitter on a different vehicle is received before receiving a frame from a transmitter 2 on the subject vehicle. Particularly, if a frame from a transmitter on a different vehicle is registered as a candidate ID in a situation where no frame is received from a transmitter 2 on the subject vehicle, the registered candidate ID may soon deviate from the permissible range of variation. Thus, a candidate ID that accidentally remains within the permissible range of variation may be identified as the ID information of a transmitter 2 on the subject vehicle. In such an instance, it is undesirable that such a candidate ID be soon determined and registered as the ID information of a transmitter 2 on the subject vehicle.

Consequently, even when a candidate ID is identified as the ID information of a transmitter 2 on a tire wheel 5a-5d of the subject vehicle, the present embodiment first makes a provisional fixing. When such a determination is subsequently found to be relatively accurate, the present embodiment registers such a candidate ID as the ID information of the transmitter 2 on the subject vehicle. More specifically, the present embodiment performs processes illustrated in FIGS. 7 and 8.

Figure 7:
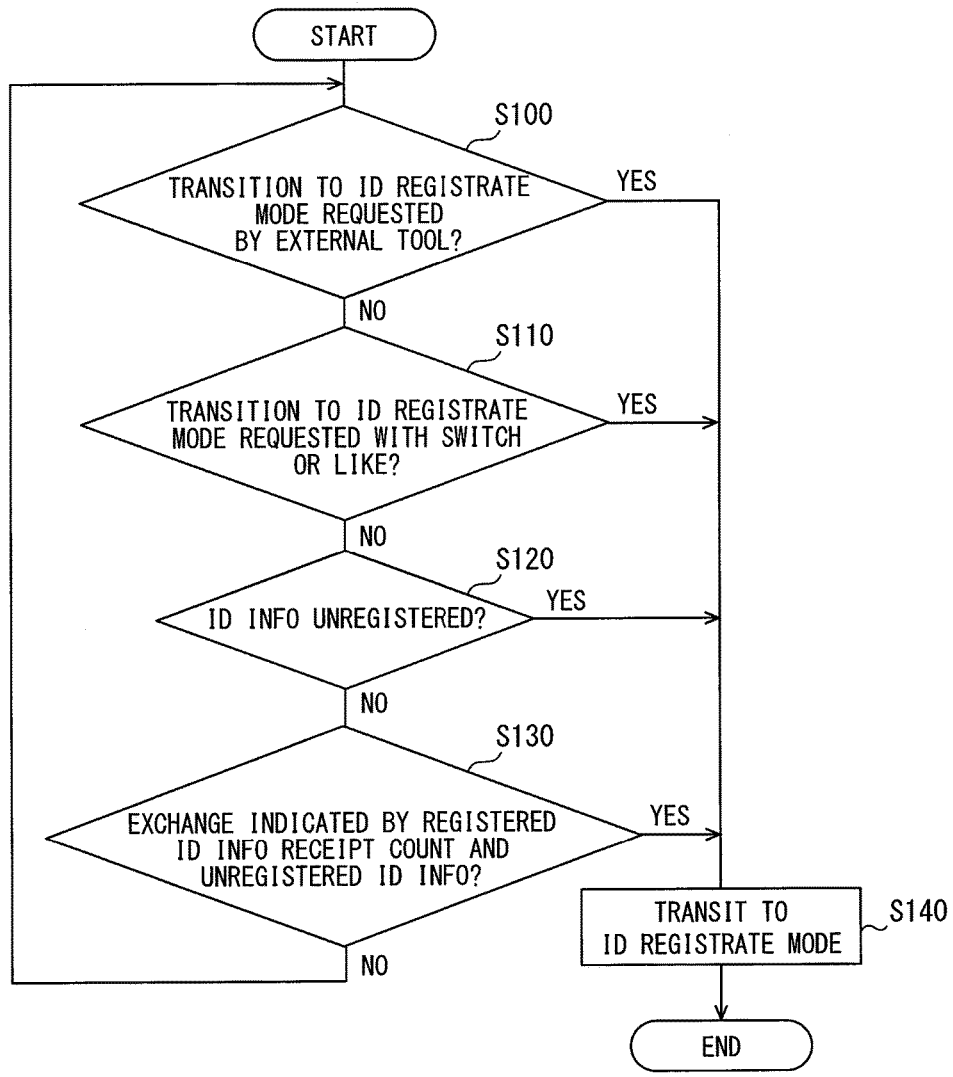
FIG. 7 is a flowchart illustrating a registration start determination process.
Figure 8:
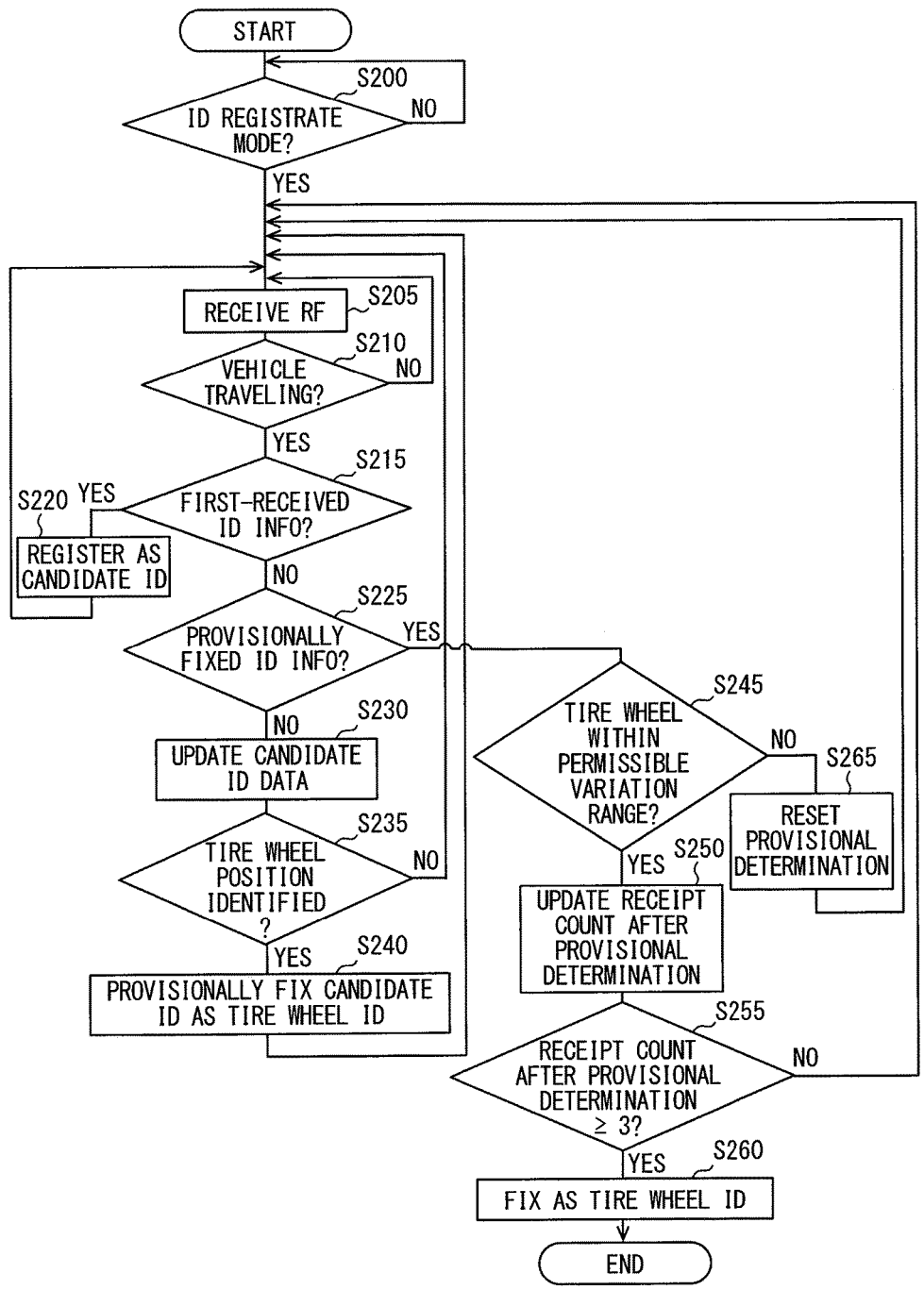
FIG. 8 is a flowchart illustrating an ID determination process according to the first embodiment.

First of all, a registration start determination process illustrated in FIG. 7 is performed to determine whether or not to transition to an ID registration mode. In the ID registration mode, an ID determination process illustrated in FIG. 8 is performed to determine and register a relatively accurate candidate ID as the ID information of a transmitter 2 on the subject vehicle. The processes illustrated in FIGS.

7 and 8 are performed at predetermined control intervals when the ignition switch (IG) is turned to energize the TPMS-ECU 3.

As illustrated in FIG. 7, steps 100 to 130 are performed to determine whether the transition to the ID registration mode is currently required.

More specifically, it is determined in step 100 whether a request for transitioning to the ID registration mode is generated through an external tool (not shown) that issues an instruction for tire wheel position detection. The external tool delivers, for example, a command for transitioning to the ID registration mode to the TPMS-ECU 3 by using radio waves or an in-vehicle LAN such as a CAN.

In step 110, it is determined whether, for example, an execution switch (not shown) for tire wheel position detection is activated to generate a request for transitioning to the ID registration mode. The execution switch for tire wheel position detection is mounted, for example, on the instrument panel. When the execution switch is activated by a user, the request is conveyed to the TPMS-ECU 3 through the in-vehicle LAN such as a CAN.

In step 120, it is determined whether the ID information of the transmitter 2 on each tire wheel 5a-5d is unregistered. If the vehicle has just been manufactured, tire wheel position detection needs to be performed because the ID information of each transmitter 2 is still not registered.

In step 130, registered ID information and unregistered ID information are compared in terms of the number of receptions to determine whether, for example, a tire exchange has possibly been made. If a tire exchange has been made, tire wheel position detection needs to be performed as well. If, for instance, the number of receptions of unregistered ID information is greater by at least a predetermined value than the number of receptions of registered ID information, it is determined in step 130 that, for example, a tire exchange has possibly been made.

Consequently, if the query is affirmatively answered in any one of steps 100 to 130, processing proceeds to step 140. In step 140, the transition to the ID registration mode is made, and the above process terminates. By contrast, if the query in negatively answered in all of steps 100 to 130, processing returns to step 100 in order to repeat the above process. The registration start determination process of performing tire wheel position detection and determining whether or not to start registering the ID information of a transmitter 2 on the subject vehicle is completed in the above-described manner.

Subsequently, the ID determination process illustrated in FIG. 8 is performed. First of all, it is determined in step 200 whether the ID registration mode prevails. If the transition to the ID registration mode is made in step 140 of FIG. 7, the query in step 200 is affirmatively answered, and processing proceeds to step 205.

In step 205, RF reception occurs, that is, a frame transmitted in the form of RF band radio waves is received, and processing proceeds to step 210. In step 210, it is determined whether the subject vehicle is traveling. Here, tire wheel position detection is performed by allowing the acceleration sensor 22 to detect acceleration that arises when the subject vehicle travels. Accordingly, if the subject vehicle is not traveling, it is excluded from tire wheel position detection. Therefore, if the query in strep 210 is affirmatively answered, processing proceeds to step 215. If, by contrast, the query is negatively answered, processing returns to step 205.

Whether the subject vehicle is traveling can be determined by acquiring, for example, vehicle speed data from the brake ECU 10 because the brake ECU 10 calculates the vehicle speed based on the detection signals of the tire wheel velocity sensors 11a-11d. Therefore, when, for example, a vehicle speed is generated, it can be determined that the subject vehicle is traveling.

In step 215, it is determined whether the ID information stored in the currently received frame is an initially received ID. If the query in step 215 is affirmatively answered, processing proceeds to step 220, and the initially received ID is registered as a candidate ID.

If, by contrast, the query in step 215 is negatively answered, the ID information stored in the currently received frame is already registered as a candidate ID. In this instance, processing proceeds to step 225. In step 225, it is determined whether the ID information stored in the currently received frame is provisionally fixed as the ID information of a transmitter 2 on the subject vehicle.

When the ID information of the transmitter 2 on a particular tire wheel 5a-5d is identified from among candidate IDs based on the tire wheel position determination logic and then provisionally fixed, it signifies that the ID information is temporarily set as the ID information to be definitely fixed. When the ID information stored in a received frame is provisionally fixed, the ID information is highly likely to be the ID information of the transmitter 2 on a particular tire wheel, but is still not definitely determined. When the ID information is provisionally fixed, it is so indicated, for example, by a provisional fixing flag in step 240, which is described later. Therefore, whether the ID information is provisionally fixed can be determined by checking whether such a provisional fixing flag is set.

If the query in step 225 is negatively answered, processing proceeds to step 230, and data about a registered candidate ID is updated. More specifically, data update is performed for tire wheel position detection based on the tire wheel position determination logic, for example, by acquiring the gear information of the candidate ID at the frame reception timing and determining whether the number of gear tooth edges (or gear teeth) indicated by the acquired gear information is within the permissible range of variation. Accordingly, as illustrated in FIGS. 6A to 6D, the data about a candidate ID is updated upon each receipt of a frame to perform tire wheel position detection.

Subsequently, processing proceeds to step 235, and it is determined whether the tire wheel position is identified for the candidate ID. That is to say, as illustrated in FIGS. 6A to 6D, it is determined whether only one of the four tire wheels 5a-5d is within the permissible range of variation for the candidate ID. If it is determined that only one tire wheel is within the permissible range of variation, processing proceeds to step 240. In step 240, the candidate ID is provisionally fixed as the ID information of the transmitter 2 on a tire wheel that is identified as the one tire wheel within the permissible range of variation. Upon completion of step 240, processing returns to step 205. If, by contrast, it is not determined that only one tire wheel is within the permissible range of variation, processing returns to step 205, and then steps 205 and beyond are repeated until the provisional fixing is made.

When the provisional fixing is made for the candidate ID as described above, the query in step 225 is affirmatively answered. In such an instance, processing proceeds to steps 245 and beyond so that the provisionally fixed candidate ID is processed for an increase in accuracy.

More specifically, in step 245, for the provisionally fixed candidate ID, tire wheel position detection is continuously performed based on the tire wheel position determination logic in order to determine whether the identified relevant tire wheel continue to be within the permissible range of variation. If the relevant tire wheel is within the permissible range of variation, processing proceeds to step 250, and the number of receptions after provisional fixing is updated by incrementing the number by one. Upon completion of step 250, processing proceeds to step 255, and it is determined whether the number of receptions after provisional fixing is equal to or greater than a first predetermined value (e.g., three). If the number of receptions after provisional fixing has reached the first predetermined value, processing proceeds to step 260 because it is highly likely that the provisionally fixed candidate ID is the ID information of the transmitter 2 on the relevant tire wheel. In step 260, the provisionally fixed candidate ID is definitely determined and registered as the ID information of the transmitter 2 on the relevant tire wheel.

Meanwhile, if, in step 245, the relevant tire wheel is outside the permissible range of variation for the provisionally fixed candidate ID, it can be said that the provisionally fixed candidate ID is not the ID information of the transmitter 2 on the relevant tire wheel. In this instance, therefore, processing proceeds to step 265, and the provisional fixing is reset. Upon completion of step 265, processing returns to step 205. In the manner described above, a relatively accurate candidate ID can be registered as the ID information of a transmitter 2 on each tire wheel 5*a*-5*d* of the subject vehicle.

After tire wheel position detection is completed as described above, tire pressure detection is performed. More specifically, in tire pressure detection, each transmitter 2 transmits a frame at fixed time intervals. Each time a frame is transmitted from each transmitter 2, the TPMS-ECU 3 receives the frames of four running tire wheels. Then, based on ID information stored in each frame, the TPMS-ECU 3 identifies which transmitter 2 attached to a tire wheel 5*a*-5*d* has transmitted the frame, and detects the tire pressure of each tire wheel 5*a*-5*d* from information of tire pressure. Thus, a decrease in the tire pressure of each tire wheel 5*a*-5*d* can be detected to identify a tire wheel 5*a*-5*d* whose tire pressure is decreased. When a tire pressure decrease is detected, it is conveyed to the meter 4. The meter 4 then reports the decrease in the tire pressure of a particular tire to the driver by displaying information indicative of the decrease in the tire pressure while identifying the affected one of the tire wheels 5*a*-5*d*.

As described earlier, the gear information indicative of tooth positions of the gears 12*a*-12*d* is acquired at predetermined time intervals based on detection signals of the tire wheel velocity sensors 11*a*-11*d* that detect the passage of teeth of the gears 12*a*-12*d*, which rotate in coordination with the tire wheels 5*a*-5*d*. Then, the permissible range of variation is set based on the tooth positions at the frame reception timing. If the tooth positions at the frame reception timing after the setup of the permissible range of variation are outside the permissible range of variation, a tire wheel attached with the transmitter 2 having transmitted the associated frame is eliminated from the candidates. Eventually, a remaining tire wheel is registered as the tire wheel attached with the transmitter 2 having transmitted the associated frame. Consequently, the tire wheel positions of running tire wheels can be identified without having to wait until a large amount of data is acquired.

Further, even when one of the candidate IDs is identified as the ID information of the transmitter 2 on a particular tire wheel 5*a*-5*d* of the subject vehicle during tire wheel position detection, such a candidate ID is not definitely determined and registered immediately, but is provisionally fixed for the time being. When the candidate ID is later found to be relatively accurate, it is definitely determined and registered. In this manner, a relatively accurate candidate ID can be registered as the ID information of a transmitter 2 on each tire wheel 5*a*-5*d* of the subject vehicle. This further inhibits the ID information of a transmitter on a different vehicle from being erroneously identified as the ID information of a transmitter 2 on the subject vehicle.

Further, as the ID information of the transmitter 2 on each tire wheel 5*a*-5*d* can be registered in the above-described manner, a triggering device having an antenna need not be provided for each tire wheel. This prevents an increase in the number of parts due to the necessity of additional parts, and thus avoids a cost increase. Moreover, a two-axis acceleration sensor, which is a highly functional additional part, need not be installed.

(Second Embodiment)

A second embodiment will now be described. The second embodiment is similar to the first embodiment except for the method of tire wheel position determination. Therefore, only differences from the first embodiment will be described below.

Figure 9:
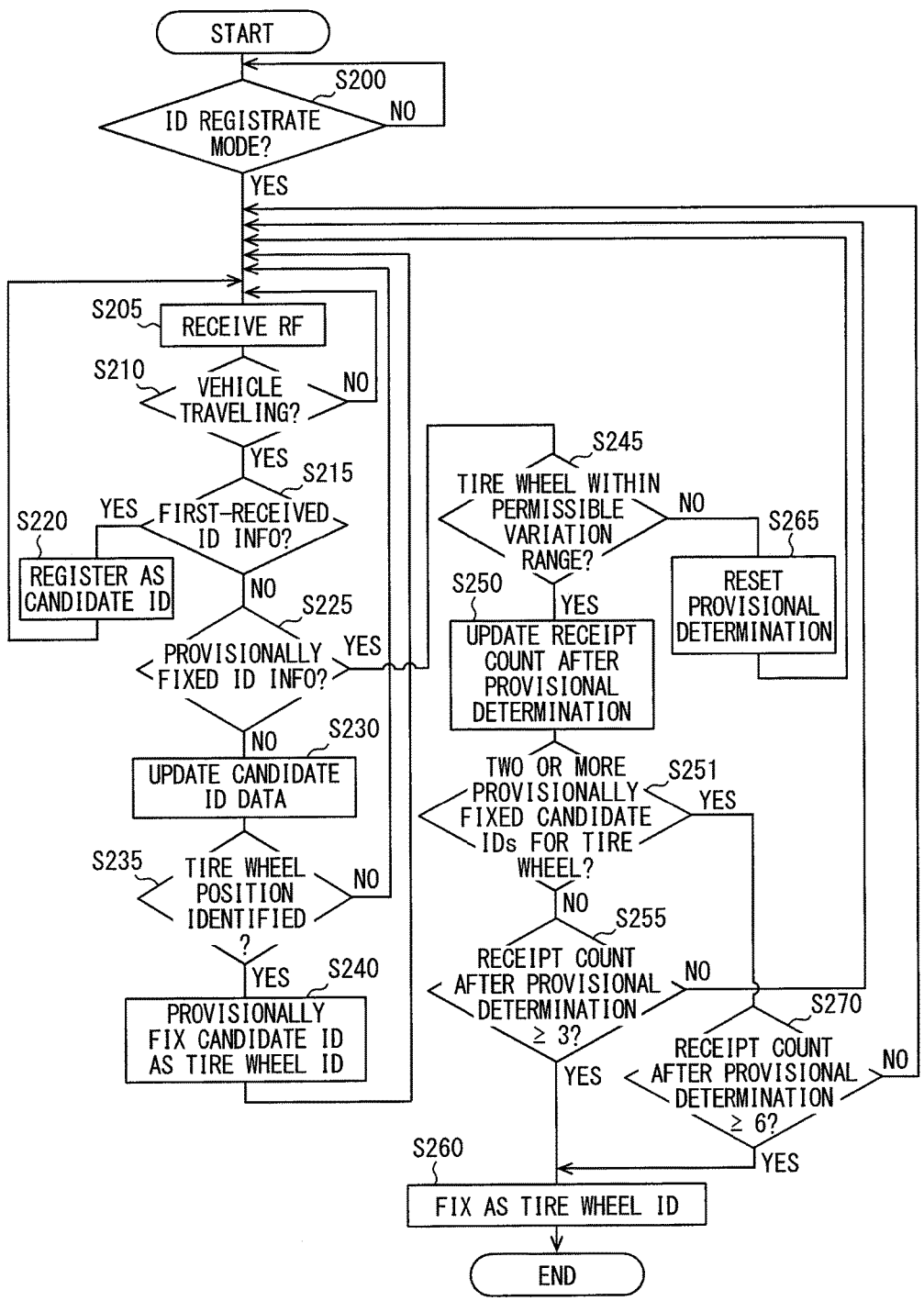
FIG. 9 is a flowchart illustrating the ID determination process according to a second embodiment.

The first embodiment is configured on the assumption that only one candidate ID is identified as the ID information of the transmitter 2 on a particular tire wheel 5*a*-5*d* of the subject vehicle. Meanwhile, the second embodiment is configured to determine the tire wheel position even when two or more candidate IDs are simultaneously identified as the ID information of the transmitter 2 on a particular tire wheel 5*a*-5*d* of the subject vehicle. More specifically, the second embodiment performs an ID determination process illustrated in FIG. 9 instead of the ID determination process that is performed in the first embodiment as illustrated in FIG. 8. Steps 200 to 265 of FIG. 9 are the same as steps 200 to 265 of FIG. 8 and will not be redundantly described.

First of all, steps 200 to 250 are performed in the same manner as indicated in FIG. 8, and processing proceeds to step 251. In step 251, it is determined whether there are a plurality of fixed determined candidate IDs for the relevant tire wheel.

Tire wheel position detection based on the tire wheel position determination logic is performed for each candidate ID. A plurality of candidate IDs may be within the permissible range of variation that is set for a particular tire wheel. In such an instance, the query in step 251 is affirmatively answered. If the query in step 251 is negatively answered, steps 255 and beyond are performed in the same manner as in the first embodiment. If, by contrast, the query in step 251 is affirmatively answered, processing proceeds to step 270.

In step 270, it is determined whether the number of receptions after provisional fixing is equal to or greater than a second predetermined value (e.g., six). The second predetermined value is greater than the first predetermined value. If the number of receptions after provisional fixing is equal to or greater than the second predetermined value, processing proceeds to step 260 because it is highly likely that the associated provisionally-fixed candidate ID is the ID information of the transmitter 2 on the relevant tire wheel. In step 260, the associated provisionally-fixed candidate ID is definitely determined and registered as the ID information of the transmitter 2 on the relevant tire wheel.

As described above, when there are a plurality of provisionally fixed candidate IDs for a particular tire wheel, the number of receptions for accuracy verification is set to be greater than when there is only one provisionally fixed candidate ID for a particular tire wheel. More specifically, the number of receptions for accuracy verification is changed from the first predetermined value to the second predetermined value. Therefore, a second candidate ID that is not correct as the ID information of the transmitter 2 on the relevant tire wheel may be outside the permissible range of variation while the data about the second predetermined value is being updated for the relevant tire wheel. This further inhibits the ID information of a transmitter on a different vehicle from being erroneously identified as the ID information of a transmitter 2 on the subject vehicle.

(Third Embodiment)

A third embodiment will now be described. The third embodiment is also similar to the first embodiment except for the method of tire wheel position determination. Therefore, only differences from the first embodiment will be described below.

Figure 10:
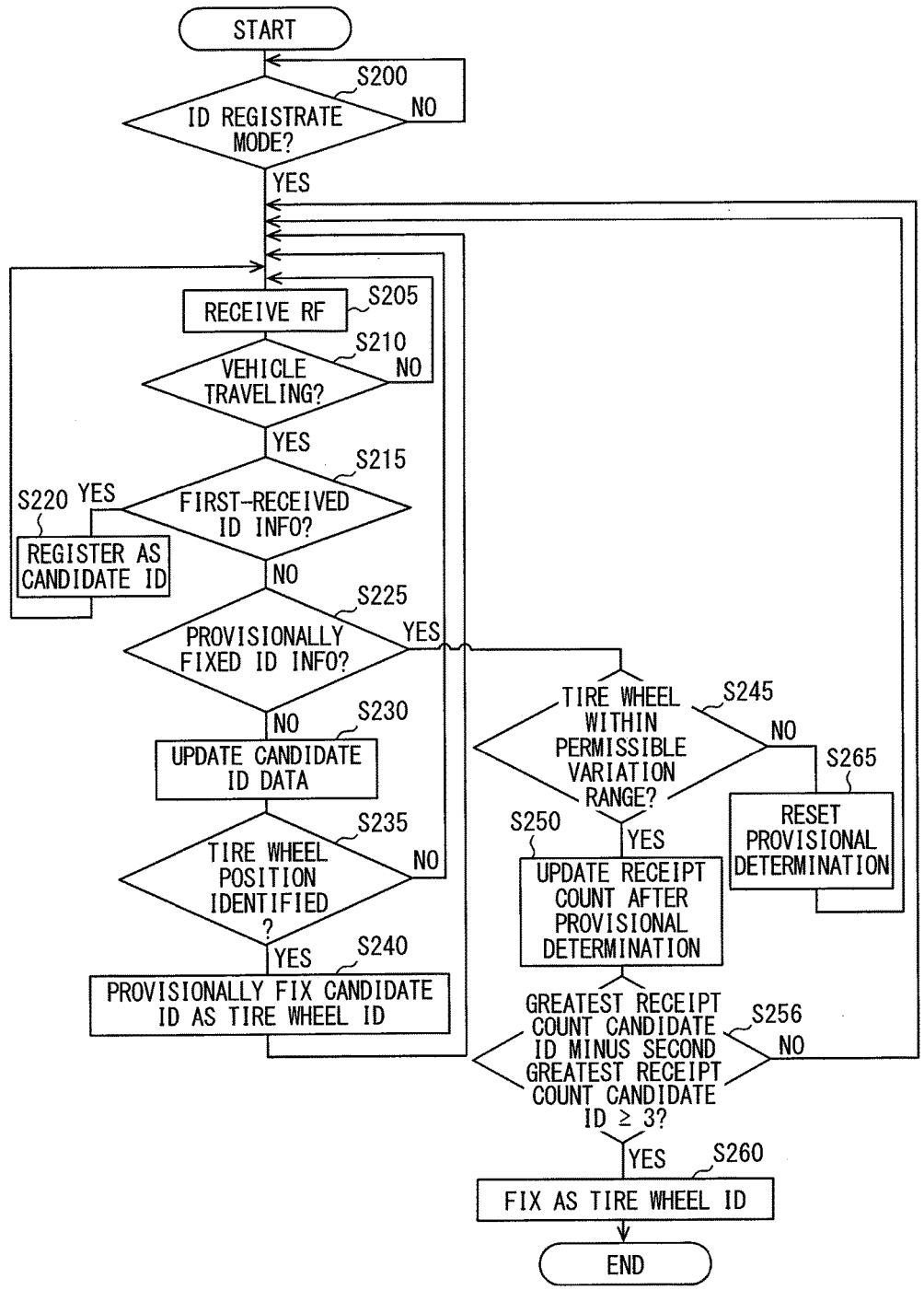
FIG. 10 is a flowchart illustrating the ID determination process according to a third embodiment.

The third embodiment is configured to determine the tire wheel position in a manner different from that used in the second embodiment even when two or more candidate IDs are simultaneously identified as the ID information of the transmitter 2 on a particular tire wheel 5a-5d of the subject vehicle. More specifically, the third embodiment performs an ID determination process illustrated in FIG. 10 instead of the ID determination process that is performed in the first embodiment as illustrated in FIG. 8. Steps 200 to 250, 260, and 265 of FIG. 10 are the same as steps 200 to 250, 260, and 265 of FIG. 8 and will not be redundantly described.

First of all, steps 200 to 250 are performed in the same manner as indicated in FIG. 8, and processing proceeds to step 256. In step 256, provisionally fixed candidate IDs for the relevant tire wheel are checked to determine whether the difference between the greatest number of receptions and the second greatest number of receptions is equal to or greater than a predetermined value (e.g., three). If, in this instance, there is only one provisionally fixed candidate ID for the relevant tire wheel, step 256 is performed on the assumption that the second greatest number of receptions is 0 (zero). If the query in step 256 is affirmatively answered, processing proceeds to step 260 because the candidate ID exhibiting the greatest number of receptions is highly likely to be the ID information of the transmitter 2 on the relevant tire wheel. In step 260, the candidate ID exhibiting the greatest number of receptions is definitely determined and registered as the ID information of the transmitter 2 on the relevant tire wheel.

As described above, when there are a plurality of provisionally fixed candidate IDs for a particular tire wheel, it is determined, based on the difference between the number of candidate ID receptions, or more specifically, on the difference between the greatest number of receptions and the second greatest number of receptions, which candidate ID represents the correct ID information of the transmitter 2 on the relevant tire wheel. This further inhibits the ID information of a transmitter on a different vehicle from being erroneously identified as the ID information of a transmitter 2 on the subject vehicle. Further, if a plurality of candidate IDs exist for a particular tire wheel, tire wheel position detection does not reach completion until the candidate IDs are narrowed down to one. Therefore, if a frame including a particular candidate ID is not received for an extended period of time, thereby keeping the relevant candidate ID within the permissible range of variation, the time required for the completion of tire wheel position detection may increase. However, the third embodiment determines the ID information of a transmitter 2 on the subject vehicle based on the difference between the number of candidate ID receptions. This reduces the time required for the completion of tire wheel position detection.

(Fourth Embodiment)

A fourth embodiment will now be described. The fourth embodiment is similar to the third embodiment except for the method of tire wheel position determination. Therefore, only differences from the third embodiment will be described below.

When a plurality of candidate IDs are registered for a particular tire wheel, the third embodiment checks each of the tire wheels 5a-5d to determine whether the difference between the greatest number of receptions and the second greatest number of receptions is equal to or greater than a predetermined value. In this instance, when the difference is equal to or greater than the predetermined value, the third embodiment determines and registers a candidate ID exhibiting the greatest number of receptions as the ID information of the transmitter 2 on the relevant tire wheel without regard to the other tire wheels. Meanwhile, the fourth embodiment determines and registers a candidate ID exhibiting the greatest number of receptions as the ID information of the transmitter 2 on the relevant tire wheel only when the difference between the greatest number of receptions and the second greatest number of receptions is equal to or greater than a predetermined value in each of the tire wheels 5a-5d.

Figure 11:
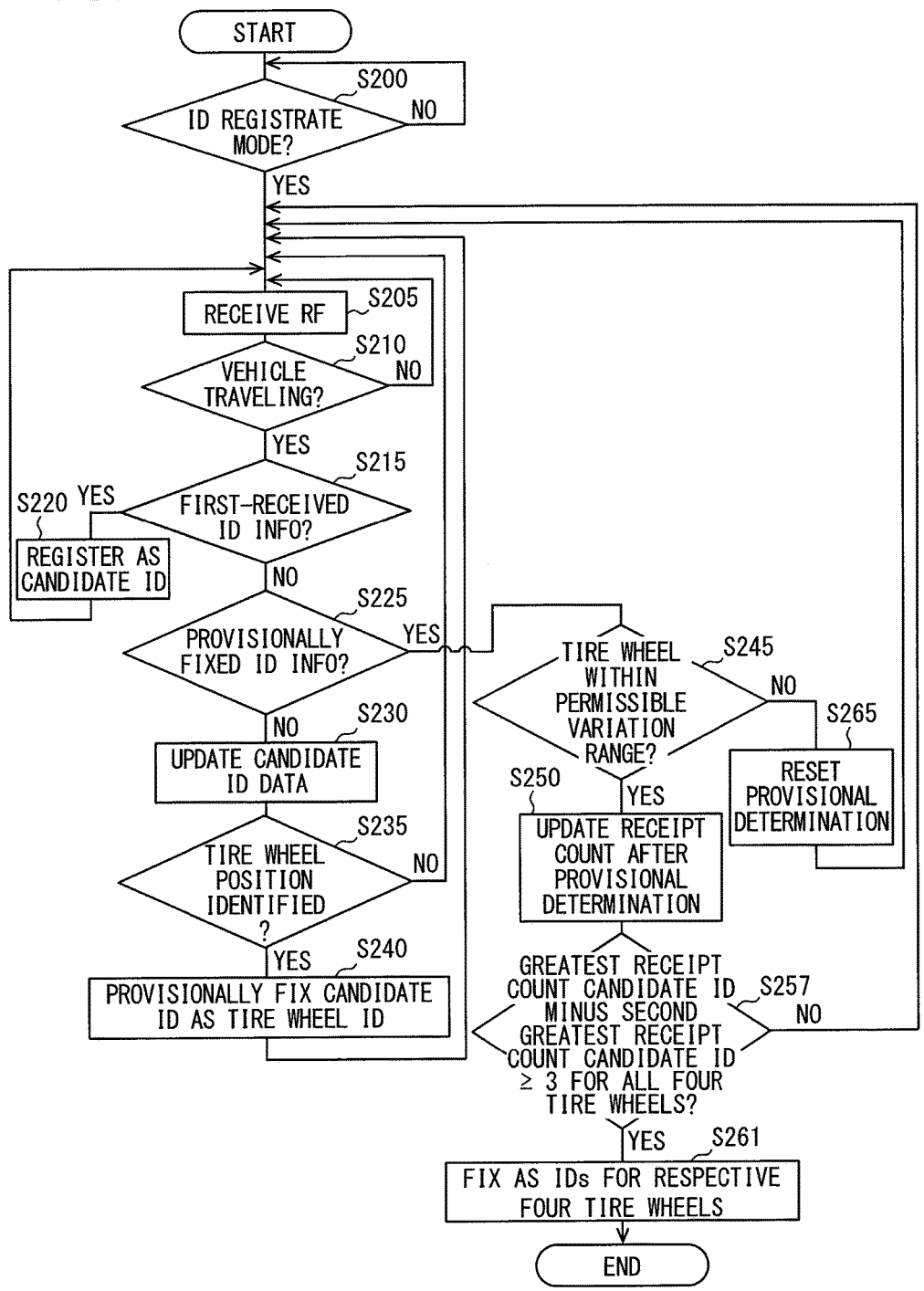
FIG. 11 is a flowchart illustrating the ID determination process according to a fourth embodiment.

More specifically, the fourth embodiment performs an ID determination process illustrated in FIG. 11 instead of the ID determination process that is performed in the first embodiment as illustrated in FIG. 8. In the ID determination process according to the fourth embodiment, steps 257 and 261 of FIG. 11 are performed instead of steps 256 and 260 of FIG. 10. In FIG. 11, steps other than steps 257 and 261 are the same as those in the third embodiment.

First of all, steps 200 to 250 are performed in the same manner as indicated in FIG. 10, and processing proceeds to step 257. In step 257, provisionally fixed candidate IDs for all the four tire wheels 5a-5d are checked to determine whether the difference between the greatest number of receptions and the second greatest number of receptions is equal to or greater than a predetermined value (e.g., three). If, in this instance, there is only one provisionally-fixed candidate ID for each of the four tire wheels 5a-5d, step 257 is performed on the assumption that the second greatest number of receptions is 0 (zero). If the query in step 257 is affirmatively answered, the candidate ID exhibiting the greatest number of receptions for each of the four tire wheels 5a-5d is highly likely to be the ID information of the transmitter 2 on the associated tire wheel. Therefore, processing proceeds to step 261. In step 261, the candidate ID exhibiting the greatest number of receptions for each of the four tire wheels 5a-5d is determined and registered as the ID information of the transmitter 2 on the associated tire wheel.

As described above, when the difference between the greatest number of receptions and the second greatest number of receptions is equal to or greater than the predetermined value at the same time in each of the four tire wheels 5a-5d, the relevant candidate ID is determined and registered as the ID information of the transmitter 2 on the associated tire wheel. This further inhibits the ID information of a transmitter on a different vehicle from being erroneously identified as the ID information of a transmitter 2 on the subject vehicle. That is to say, in any of the four tire wheels 5a-5d, if the ID information of a transmitter on a different vehicle is provisionally fixed in an accidental manner as the ID information of a transmitter 2 on the subject vehicle, a condition that the difference between the greatest number of receptions and the second greatest number of receptions should be equal to or greater than the predetermined value may not be met by the other tire wheels. In such an instance, the number of receptions of a frame having the ID information of the transmitter 2 on the subject vehicle may increase before the above condition is met by the other tire wheels so as to reverse the relationship between the number of receptions of the ID information of the transmitter 2 on the subject vehicle and the number of receptions of the ID information of the transmitter on the different vehicle. In such a situation, if the ID information is determined and registered for the first time when the condition is met by all tire wheels instead of determining and registering the ID information each time the condition is met by one tire wheel, the ID information of the transmitter on the different vehicle is inhibited from being erroneously identified as the ID information of the transmitter 2 on the subject vehicle.

(Alternative Embodiments)

The present disclosure is not limited to the foregoing embodiments, but the embodiments can be appropriately modified.

In the foregoing embodiments, the permissible range of variation is gradually narrowed by changing it at each time point of frame reception, but the permissible range of variation to be set centrally with respect to the tooth positions is assumed to be constant. Alternatively, however, the permissible range of variation to be set centrally with respect to the tooth positions may be modified as well. For example, the variation in the tooth positions may increase with an increase in the vehicle speed. Therefore, when the permissible range of variation is increased with an increase in the vehicle speed, a more accurate permissible range of variation can be set. Further, the longer the sampling intervals at which the acceleration sensor 22 detects acceleration, the lower the accuracy of detection of timing at which the acceleration sensor 22 reaches the predetermined angle. Therefore, a more accurate permissible range of variation can be set by changing the permissible range of variation accordingly. In such an instance, as the transmitter 2 is aware of the sampling intervals, the transmitter 2 can transmit a frame including data for determining the permissible range of variation.

Further, in the foregoing embodiments, the angle at which frame transmission is performed is such that when the angle is 0°, the acceleration sensor 22 is positioned above and centered with respect to the central axis of each tire wheel 5a-5d. However, such a scheme is merely an example. Alternatively, an angle of 0° may be regarded as an arbitrary circumferential position of a tire wheel.

In the foregoing embodiments, the TPMS-ECU 3 acquires the gear information from the brake ECU 10. However, it is necessary that the TPMS-ECU 3 acquire the number of gear tooth edges or gear teeth as the gear information. Therefore, an alternative is to acquire the gear information from a different ECU or input the detection signals of the tire wheel velocity sensors 11a-11d and acquire the number of gear tooth edges or gear teeth from the detection signals. Particularly, the foregoing embodiments have been described on the assumption that the TPMS-ECU 3 is separate from the brake ECU 10. Alternatively, however, these ECUs may be integrated into a single ECU. In such an instance, the single ECU directly inputs the detection signals of the tire wheel velocity sensors 11a-11d and acquires the number of gear tooth edges or gear teeth from the detection signals. Additionally, the number of gear tooth edges or gear teeth can be constantly acquired in that instance. Consequently, in contrast to a case where such information is acquired at predetermined intervals, tire wheel position detection can be performed based on the gear information obtained at the exact frame reception timing.

Furthermore, the foregoing embodiments have been described on the assumption that the tire wheel position detection device is mounted in a vehicle 1 having four running tire wheels 5a-5d. However, the above-described tire wheel position detection device is also applicable to a vehicle having a greater number of running tire wheels.

Moreover, an alternative embodiment may be configured so that the tire wheel velocity sensors 11a-11d detect the passage of teeth of a gear that rotates in coordination with the rotation of the tire wheels 5a-5d. Therefore, the gear may be configured so that a tooth portion having a circumferential conductor and a portion between teeth alternate to exhibit different magnetoresistance values. More specifically, the gear may not only be a general type having an outer portion formed of convex and concave surfaces, that is, a conductive convex surface and a nonconductive space, but also be, for example, a rotor switch that is formed of a conductive circumferential portion and a nonconductive insulator (for example, refer to JP-H10-048233A).

The steps depicted in the accompanying drawings correspond to sections (means) for performing various processes. More specifically, a portion for performing a process in step 240 corresponds to a provisional fixer (provisional fixing means), a portion for performing a process in step 245 corresponds to a post-provisional fixing determiner (post-provisional fixing determination means), and a portion for performing a process in step 250 corresponds to a counter (counting means). Further, a portion for performing a process in step 251 corresponds to a provisionally-fixed count determiner (provisionally-fixed count determination means), a portion for performing a process in step 255 corresponds to a first determiner (first determination means), a portion for performing a process in steps 256 and 257 corresponds to a count difference determiner (count difference determination means), and a portion for performing a process in steps 260 and 261 corresponds to a register (registration means). Furthermore, a portion for performing a process in step 270 corresponds to a second determiner (second determination means).

While the present disclosure has been described above in conjunction with embodiments, the present disclosure is not limited to the above-described embodiments. For example, the scope of the present disclosure also includes an embodiment that is obtained by appropriately combining technical elements disclosed in different embodiments.

What is claimed is:

1. A tire wheel position detection device applied to a vehicle having a vehicle body equipped with a plurality of tire wheels, each of the tire wheels having a tire, the tire wheel position detection device comprising:
   a transmitter attached to each of the tire wheels and including a first controller that creates and transmits a frame including unique identification information; and
   a receiver attached to the vehicle body and including a second controller that performs tire wheel position detection through
      receiving the frames transmitted from the transmitters through a reception antenna, and thereafter,
      selecting, from the identification informations included in the frames, candidate identification informations indicating candidates to be registered, and identifying, from the candidate identification informations, the candidate identification informations that match the transmitters attached to the tire wheels of the vehicle, and storing the tire wheels and the identification informations of the transmitters attached to the tire wheels in association with each other, wherein:

the transmitter includes an acceleration sensor that outputs a detection signal based on acceleration including a gravitational acceleration component, the gravitational acceleration component being varied by rotation of the tire wheel attached with the transmitter;

the first controller of the transmitter detects an angle of the transmitter based on the gravitational acceleration component included in the detection signal of the acceleration sensor and repeatedly transmits the frame at time points at which the angle is a predetermined transmission angle where an arbitrary circumferential position of the tire wheel that is centered with respect to a central axis of the tire wheel attached with the transmitter is an angle of 0 degrees;

the second controller of the receiver performs the tire wheel position detection through:

acquiring gear information indicative of tooth positions of gears based on detection signals of tire wheel velocity sensors, the tire wheel velocity sensors detecting passage of teeth of the gears rotating in coordination with the tire wheels, each gear having a circumferential surface with the tooth portions and portions between the tooth portions to alternately exhibit different magnetoresistance values, the tooth portions being conductive bodies;

setting a permissible range of variation based on the tooth positions at a time point of reception of the frame;

when the tooth positions at a time point of reception of the frame after the setting of the permissible range of variation are outside the permissible range of variation, eliminating the tire wheel from tire wheel candidates attached with the transmitter having transmitted the frame; and identifying and registering a remaining tire wheel as the tire wheel attached with the transmitter having transmitted the frame; and the second controller includes:

a provisional fixer that, before the registration, makes a provisional fixing of each individual candidate identification information when the tire wheel attached with the transmitter having transmitted the frame is identified based on the tooth positions being within the permissible range of variation;

a post-provisional-fixing determiner that, after the provisional fixing, determines whether the tooth positions at a time point of reception of the frame including the provisionally fixed candidate identification information are within the permissible range of variation;

a counter that, after the provisional fixing, measures the number of receptions of the frame including the provisionally fixed candidate identification information at which the tooth positions continue to remain within the permissible range of variation;

a first determiner that determines whether the number of receptions is equal to or greater than a first predetermined value; and a register that, when the number of receptions is equal to or greater than the first predetermined value, definitely determines and registers the provisionally fixed candidate identification information as the identification information of the identified tire wheel.

2. The tire wheel position detection device according to claim 1, wherein:

the second controller includes:

a provisionally-fixing count determiner that determines whether a plurality of the provisionally fixed candidate identification informations exist, and a second determiner that, when the number of provisionally fixed candidate identification informations is determined to be two or more, determines whether the number of receptions is equal to or greater than a second predetermined value, the second predetermined value being greater than the first predetermined value; and when the number of receptions is determined to be equal to or greater than the second predetermined value, the register definitely determines and registers the provisionally fixed candidate identification information as the identification information of the identified tire wheel.

3. A tire wheel position detection device applied to a vehicle having a vehicle body equipped with a plurality of tire wheels, each of the tire wheels having a tire, the tire wheel position detection device comprising:

a transmitter attached to each of the tire wheels and including a first controller that creates and transmits a frame including unique identification information; and a receiver attached to the vehicle body and including a second controller that performs tire wheel position detection through:

receiving the frames transmitted from the transmitters through a reception antenna, and thereafter selecting, from the identification informations included in the frame, candidate identification informations indicating candidates to be registered, and identifying, from the candidate identification informations, the candidate identification informations that match the transmitters attached to the tire wheels of the vehicle, and storing the tire wheels and the identification informations of the transmitters attached to the tire wheels in association with each other, wherein the transmitter includes an acceleration sensor that outputs a detection signal based on acceleration including a gravitational acceleration component, the gravitational acceleration component being varied by rotation of the tire wheel attached with the transmitter;

the first controller of the transmitter detects an angle of the transmitter based on the gravitational acceleration component included in the detection signal of the acceleration sensor and repeatedly transmits the frame at time points at which the angle is a predetermined transmission angle where an arbitrary circumferential position of the tire wheel that is centered with respect to the central axis of the tire wheel attached with the transmitter is an angle of 0 degrees;

the second controller of the receiver performs the tire wheel position detection through:

acquiring gear information indicative of tooth positions of gears based on detection signals of tire wheel velocity sensors detecting passage of teeth of the gears rotating in coordination with the tire wheels, each gear having a circumferential surface with tooth portions and portions between the teeth to alternately exhibit different magnetoresistance values, the tooth portions being conductive bodies;

setting a permissible range of variation based on the tooth positions at a time point of reception of the frame;

when the tooth positions at a time point of reception of the frame after the setting of the permissible range of variation are outside the permissible range of variation, eliminating the tire wheel from tire wheel candidates attached with the transmitter having transmitted the frame; and identifying and registering a remaining tire wheel as the tire wheel attached with the transmitter having transmitted the frame; and the second controller includes:

a provisional fixer that, before the registration, makes a provisional fixing of each individual candidate identification information when the tire wheel attached with the transmitter having transmitted the frame is identified based on the tooth positions being within the permissible range of variation;

a post-provisional-fixing determiner that, after the provisional fixing, determines whether the tooth positions at a time point of reception of the frame including the provisionally fixed candidate identification information are within the permissible range of variation;

a counter that, after the provisional fixing, measures the number of receptions of the frame including the provisionally fixed candidate identification information at which the tooth positions continue to remain within the permissible range of variation;

a count difference determiner that, when a plurality of the provisionally fixed candidate identification informations exist, determines whether a difference between the greatest number of receptions and the second greatest number of receptions among the respective numbers of receptions of the frames including the provisionally fixed candidate identification informations, is equal to or greater than a predetermined value; and a register that, when the difference is determined to be equal to or greater than the predetermined value, definitely determines and registers the candidate identification information exhibiting the greatest number of receptions as the identification information of the identified tire wheel.

4. The tire wheel position detection device according to claim 3, wherein, when it is determined for each of the tire wheels that the difference is equal to or greater than the predetermined value, the register definitely determines and registers the candidate identification information exhibiting the greatest number of receptions as the identification information of the identified tire wheel.

5. A tire pressure monitoring system comprising a tire wheel position detection device recited in claim 1, wherein:

the transmitter includes a sensing section that outputs a detection signal based on pressure of the tire attached to each of the tire wheels, allows the first controller to perform signal processing on the detection signal of the sensing section, stores tire pressure information derived from the detection signal in the frame, and transmits the frame to the receiver; and the receiver causes the second controller to detect the pressure of the tire attached to each of the tire wheels from the tire pressure information.

\* \* \* \* \*